United States Patent
Sato et al.

(10) Patent No.: US 12,383,834 B2
(45) Date of Patent: Aug. 12, 2025

(54) STORAGE MEDIUM, INFORMATION PROCESSING SYSTEM, AND GAME PROCESSING METHOD

(71) Applicant: NINTENDO CO., LTD., Kyoto (JP)

(72) Inventors: Yuya Sato, Kyoto (JP); Takuma Deguchi, Kyoto (JP); Yosuke Sakooka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 323 days.

(21) Appl. No.: 18/323,947

(22) Filed: May 25, 2023

(65) Prior Publication Data

US 2024/0082724 A1  Mar. 14, 2024

(30) Foreign Application Priority Data

Sep. 12, 2022 (JP) .................................. 2022-144904

(51) Int. Cl.
 *A63F 13/56* (2014.01)
(52) U.S. Cl.
 CPC .................... *A63F 13/56* (2014.09)
(58) Field of Classification Search
 CPC ........ A63F 13/55; A63F 13/44; A63F 13/422; A63F 13/56; A63F 13/58; A63F 13/60;
 (Continued)

(56) References Cited

U.S. PATENT DOCUMENTS 12,172,080 B2 * 12/2024 Abe ...................... A63F 13/837
2005/0221880 A1 10/2005 Kando
(Continued)

FOREIGN PATENT DOCUMENTS

CN 113181650 7/2021
JP 2005-287757 10/2005
(Continued)

OTHER PUBLICATIONS

Nov. 12, 2024 Office Action issued in Japanese Patent Application No. 2024-176509, pp. 1-3 [machine translation included].
(Continued)

*Primary Examiner* — David L Lewis
*Assistant Examiner* — Matthew D Hoel
(74) *Attorney, Agent, or Firm* — Nixon & Vanderhye PC

(57) ABSTRACT

An example of an information processing system moves a plurality of non-player characters in a virtual space according to movement of a player character. The non-player characters are allies of the player character. The information processing system performs a first control corresponding to a non-player character, according to a second operation input performed by a user in a state where a predetermined positional relationship indicating that the non-player character and the player character are near to each other is satisfied. The non-player character on which the first control is performed is set as a designated non-player character. The information processing system performs a movement control for the plurality of non-player characters so that a distance between the player character and the designated non-player character among the plurality of non-player characters becomes shorter than a distance between the player character and any normal non-player character.

11 Claims, 26 Drawing Sheets

(58) Field of Classification Search
CPC .......... A63F 13/45; A63F 13/46; A63F 13/47; A63F 13/2145; A63F 13/573; A63F 13/577
See application file for complete search history.

(56) References Cited

U.S. PATENT DOCUMENTS

| | | | |
|---|---|---|---|
| 2008/0227543 | A1 | 9/2008 | Kawase et al. |
| 2009/0247300 | A1 | 10/2009 | Suzuki et al. |
| 2009/0305758 | A1 | 12/2009 | Nomura |
| 2013/0005462 | A1* | 1/2013 | Miyamoto ............ A63F 13/843 463/31 |
| 2013/0109470 | A1 | 5/2013 | Yamashita |
| 2015/0231509 | A1 | 8/2015 | McMain, II et al. |
| 2018/0147489 | A1 | 5/2018 | Shirakami et al. |
| 2020/0197812 | A1 | 6/2020 | Sensui |
| 2020/0254335 | A1 | 8/2020 | Taura et al. |
| 2021/0370175 | A1* | 12/2021 | Sato ................ A63F 13/5258 |
| 2022/0062760 | A1* | 3/2022 | Motokura ............ A63F 13/843 |
| 2022/0152503 | A1* | 5/2022 | Abe ...................... A63F 13/58 |
| 2022/0241691 | A1 | 8/2022 | Khan |
| 2023/0256341 | A1 | 8/2023 | Cai |
| 2023/0330524 | A1* | 10/2023 | Yokota ................ A63F 13/822 |
| 2023/0381647 | A1* | 11/2023 | Mizukami ............. A63F 13/56 |
| 2024/0082724 | A1* | 3/2024 | Sato ..................... A63F 13/573 |
| 2024/0123359 | A1* | 4/2024 | Tinari ................ A63F 13/2145 |
| 2025/0083046 | A1* | 3/2025 | Sakaguchi ............ A63F 13/56 |

FOREIGN PATENT DOCUMENTS

| | | |
|---|---|---|
| JP | 2008-220782 | 9/2008 |
| JP | 2009-075739 | 4/2009 |
| JP | 2009-233208 | 10/2009 |
| JP | 2009-291426 | 12/2009 |
| JP | 2012-061091 | 3/2012 |
| JP | 2014-061039 | 4/2014 |
| JP | 2018086085 A | 6/2018 |
| JP | 2020-096768 | 6/2020 |
| JP | 2020-130213 | 8/2020 |
| JP | 2022-118720 | 8/2022 |

OTHER PUBLICATIONS

"Craftpia" A sandbox filled with gamers' "likes" [best indie], Famitsu.com [online], Oct. 12, 2020, [Nov. 7, 2024 search], https://www.famitsu.com/news/202010/12207495.html pp. 1-10.

Impressions/Evaluation of The Last of Us 2 "A Shocking Story with a Bad Aftertaste", Cyber Journal [online], Aug. 18, 2020, [Nov. 7, 2024 search], https://cyberjournal-blog.com/?p=5038 in particular, "If you point a gun at your friend, Ellie will naturally drop her gun, so you can't attack your ally." pp. 1-31.

Sato et al., U.S. Appl. No. 18/324,075, filed May 25, 2023.

* cited by examiner

STORAGE MEDIUM, INFORMATION PROCESSING SYSTEM, AND GAME PROCESSING METHOD

CROSS REFERENCE TO RELATED APPLICATION

This application claims priority to Japanese Patent Application No. 2022-144904, filed on Sep. 12, 2022, the entire contents of which are incorporated herein by reference.

FIELD

The present disclosure relates to a storage medium, an information processing system, and a game processing method for controlling a player character and non-player characters in a game.

BACKGROUND AND SUMMARY

Conventionally, there is a technology for controlling a player character and a non-player character in a game. In such a technology, when the player character moves, the non-player character is moved together with the player character, and when the player character stops, the non-player character is also stopped. In addition, when the player character is not operated by a user, the player character is automatically moved so as to approach the non-player character present near the player character, and is caused to perform a motion on the non-player character.

In the above technology, if there are a plurality of non-player characters, the user may take time to bring the player character near to one of the plurality of non-player characters by operating the player character, and therefore may take time to cause the player character to perform a motion to the non-player character.

Therefore, the present application discloses a storage medium, an information processing system, and a game processing method that allow a player character to easily perform a motion to a desired non-player character.

(1)

An example of a non-transitory computer-readable storage medium described herein stores a game program for causing a processor of an information processing apparatus to execute game processing. The game program causes the processor to execute: performing a control for moving a player character in a virtual space according to a first operation input performed by a user; performing a control for moving a plurality of non-player characters in the virtual space according to movement of the player character, the non-player characters being allies of the player character; performing a first control corresponding to one non-player character among the plurality of non-player characters, according to a second operation input performed by the user in a state where a predetermined positional relationship indicating that the non-player character and the player character are near to each other is satisfied; and setting the non-player character on which the first control is performed, as a designated non-player character. The processor performs a movement control for the plurality of non-player characters so that a distance between the player character and the designated non-player character among the plurality of non-player characters becomes shorter than a distance between the player character and any normal non-player character different from the designated non-player character.

According to the configuration of the above (1), the first control can be more easily performed for the designated non-player character than for the normal non-player character, which allows the player character to easily perform a motion to a desired non-player character (i.e., the designated non-player character).

(2)

The processor may perform a first control corresponding to the normal non-player character, according to the second operation input performed by the user in a state where the designated non-player character is set and the normal non-player character and the player character are in the predetermined positional relationship. When the first control corresponding to the normal non-player character has been performed, the processor may change the designated non-player character having been set so far, to a normal non-player character, and sets the normal non-player character on which the first control has been performed, to a new designated non-player character.

According to the configuration of the above (2), an excessive increase in designated non-player characters can be inhibited, thereby reducing the possibility that too many designated non-player characters make it difficult to perform a motion to a desired non-player character. In addition, since the user can change the designated non-player character by the second operation input for executing the first control, the user need not perform an addition operation for the change, and can easily perform the operation.

(3)

While the plurality of non-player characters are moving according to movement of the player character, the processor may perform the movement control for the plurality of non-player characters, with a positional relationship that the distance between the designated non-player character and the player character is shorter than the distance between the normal non-player character and the player character. According to stop of movement of the player character, the processor may stop movements of the plurality of non-player characters at a position where the distance between the designated non-player character and the player character becomes shorter than the distance between the normal non-player character and the player character.

According to the configuration of the above (3), the player character can be caused to easily perform a motion to a desired non-player character in both the case where the plurality of non-player characters are moving and the case where they are stopped.

(4)

While the plurality of non-player characters are moving according to movement of the player character, the processor, according to movement of the player character toward at least one non-player character among the plurality of non-player characters, may make a moving speed of the non-player character lower than a moving speed of the player character.

According to the configuration of the above (4), the player character can be caused to easily approach the non-player character even while the designated non-player character is moving, which allows the player character to easily perform a motion to the designated non-player character.

(5)

If a fighting condition for one of the plurality of non-player characters to fight against another character has been satisfied, the processor may move the non-player character. While the non-player character is moving because of the fighting condition having been satisfied, the processor may perform the movement control for the plurality of non-player characters, with a positional relationship that the distance between the designated non-player character and the player character is shorter than the distance between the normal non-player character and the player character.

According to the configuration of the above (5), even while the designated non-player character is fighting, the designated non-player character can be easily placed at a position near the player character.

(6)

The processor may stop movements of the plurality of non-player characters according to stop of movement of the player character. In a case where the player character resumes moving after having been stopped, (1) while the player character is moving within a first range, the processor may not resume movement of the designated non-player character according to movement of the player character, and (2) the processor, according to the player character having moved out the first range, may resume movement of the designated non-player character according to movement of the player character. In a case where the player character resumes moving after having been stopped, (1) while the player character is moving within a second range, the processor may not resume movement of the normal non-player character according to movement of the player character, and (2) the processor, according to the player character having moved out of the second range, may resume movement of the normal non-player character according to movement of the player character. The first range may be narrower than the second range.

According to the configuration of the above (6), when the non-player character starts moving according to the player character that resumes moving, the designated non-player character can be easily placed at a position near the player character.

(7)

The game program may cause the processor to further execute: setting, for each of the plurality of non-player characters, a stop target position that is a target position for each of the plurality of non-player characters to stop moving according to stop of movement of the player character. The processor may set the stop target positions of the plurality of non-player characters so that a distance between the stop target position of the designated non-player character and the player character becomes shorter than a distance between the stop target position of the normal non-player character and the player character.

According to the configuration of the above (7), since the stop target positions are set, the control for moving the designated non-player character to a position near the player character is facilitated.

(8)

In a specific game scene, the processor may set, as the designated non-player character, a non-player character that is associated with the specific game scene among the plurality of non-player characters.

According to the configuration of the above (8), the player character can be caused to easily perform a motion to a specific non-player character in the specific game scene.

(9)

The first control may be a control for shifting to a readiness state of a second control that may cause the non-player character to have an influence on another object. The game program may cause the processor to further execute performing the second control according to a third operation input performed by the user, in the readiness state of the second control.

According to the configuration of the above (9), since the player can set the designated non-player character without causing the non-player character to perform the second control, setting of the designated non-player character is facilitated.

The present specification discloses examples of an information processing apparatus and an information processing system that execute the processes in the above (1) to (9). Furthermore, the present specification discloses an example of an information processing method that executes the processes in the above (1) to (9).

According to the storage medium, the information processing system, or the game processing method described above, it is possible to cause the player character to easily perform a motion to a desired non-player character.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
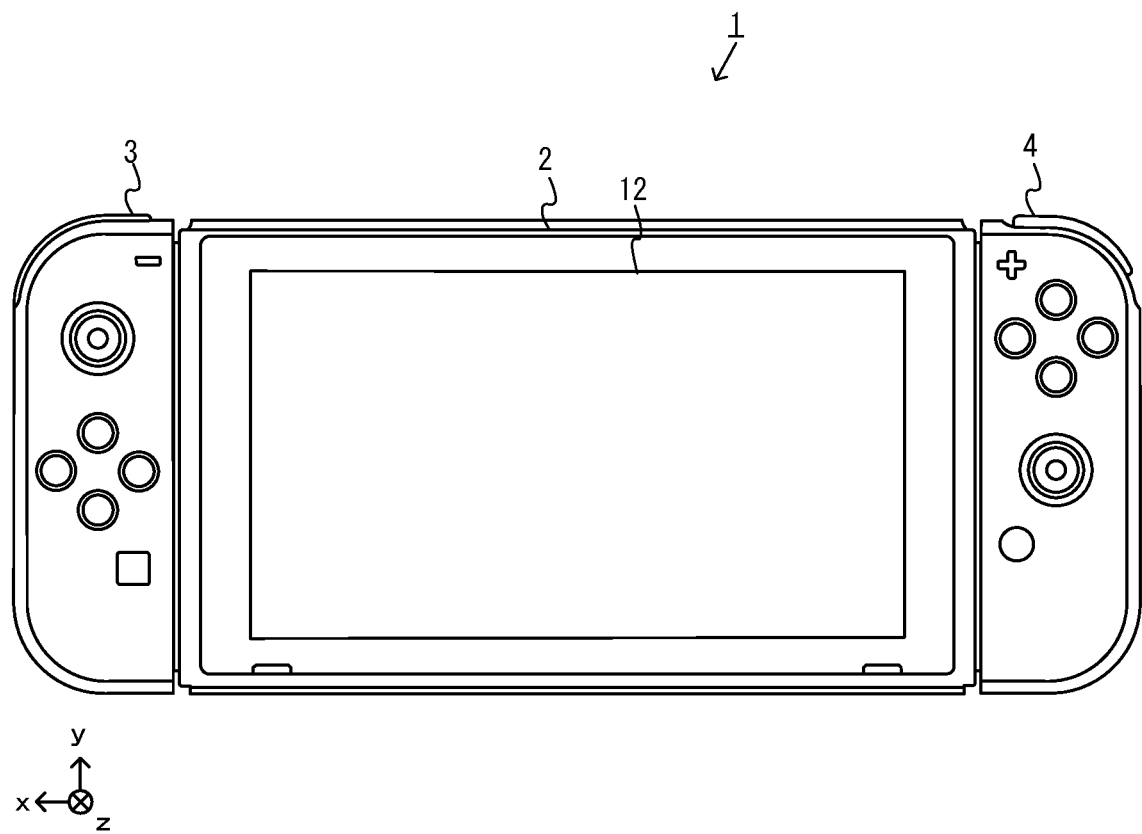
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
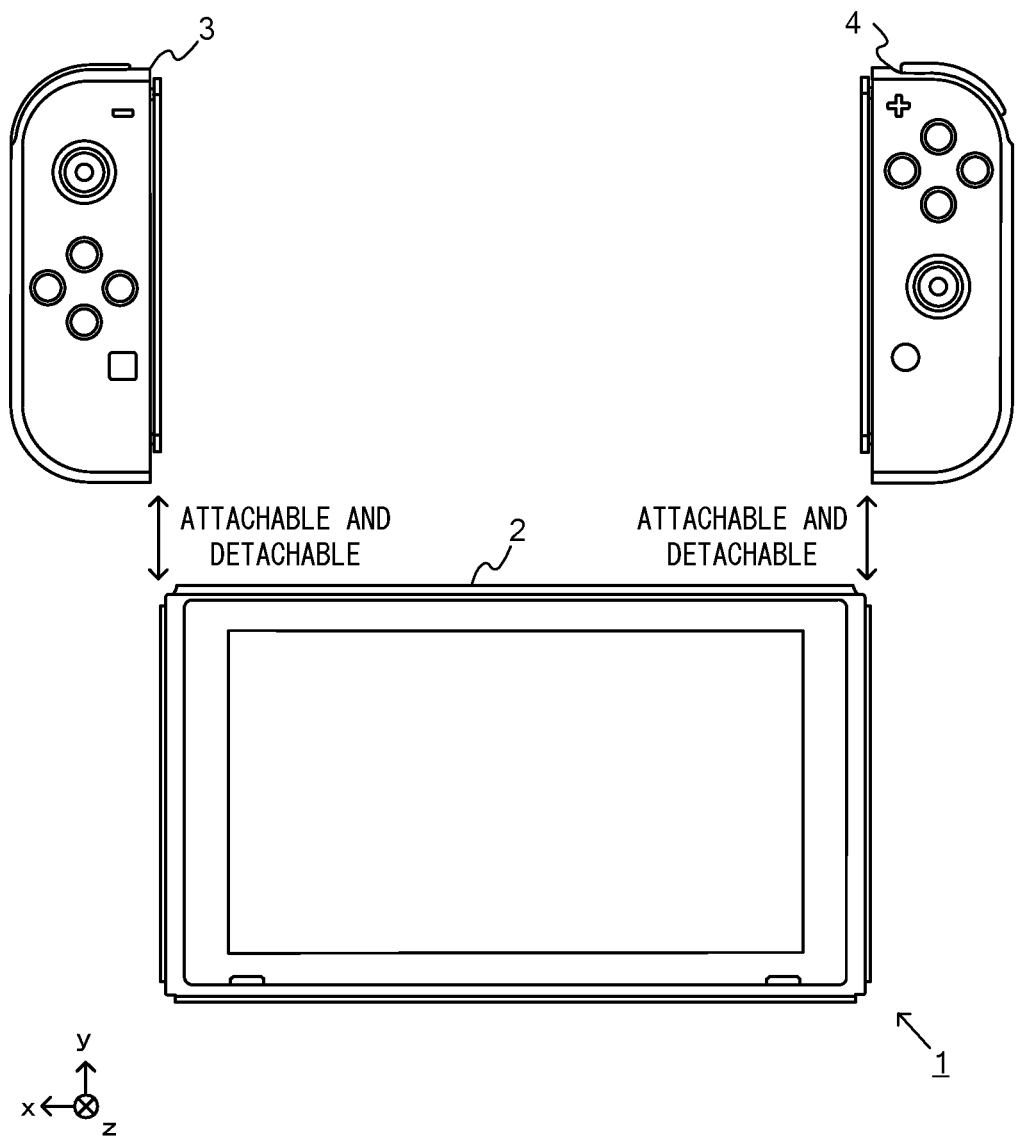
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
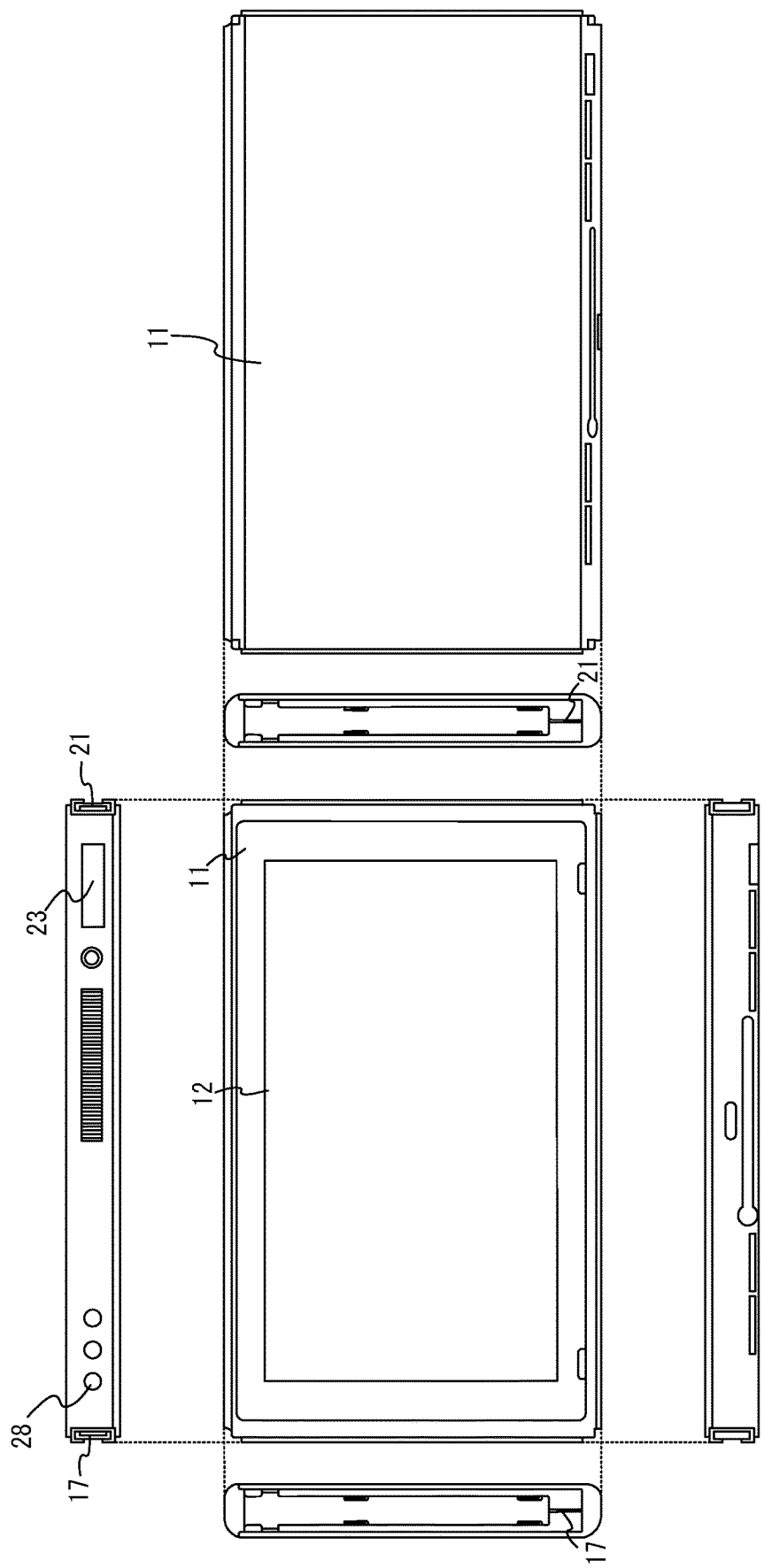
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 4:
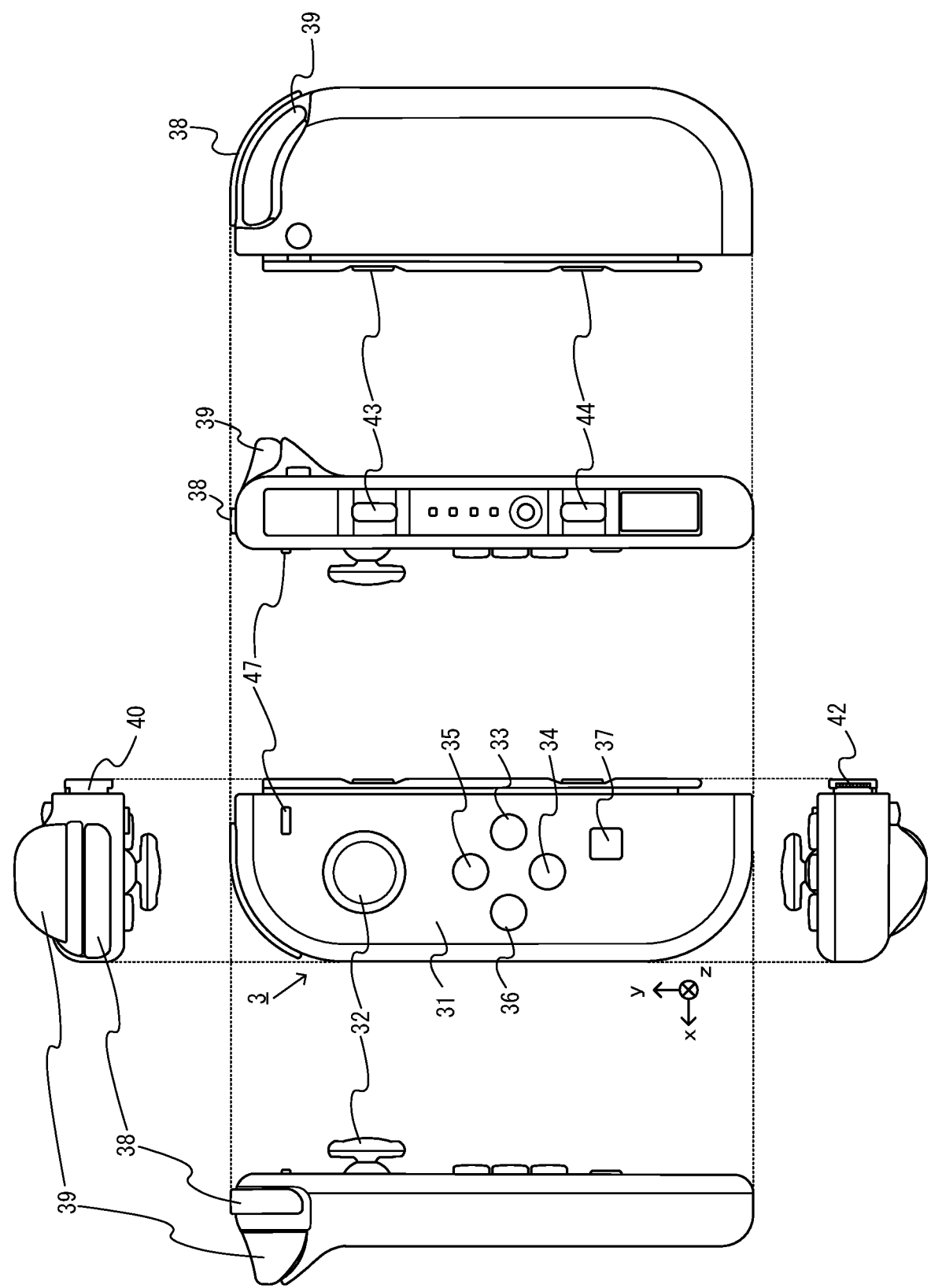
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
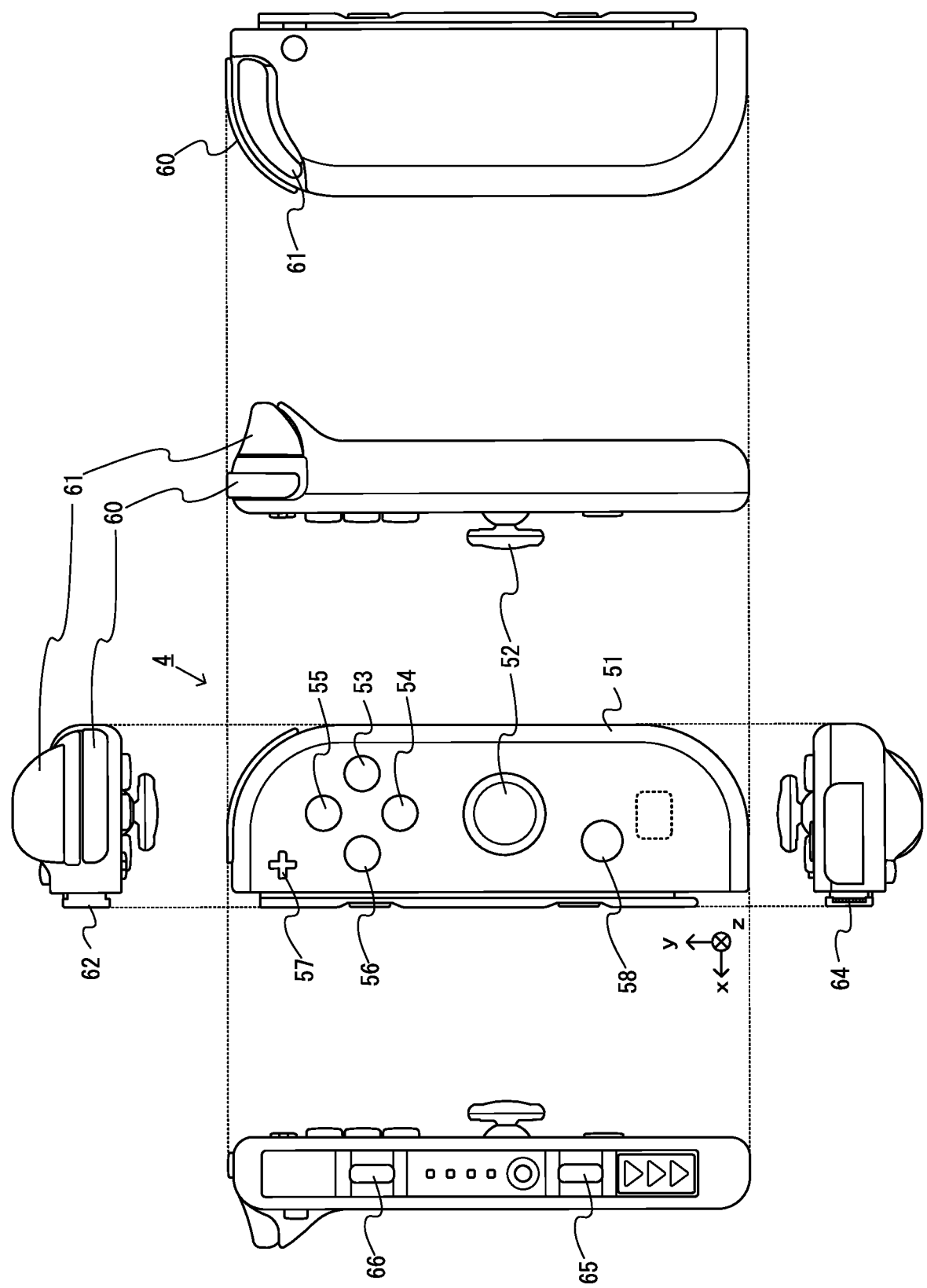
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
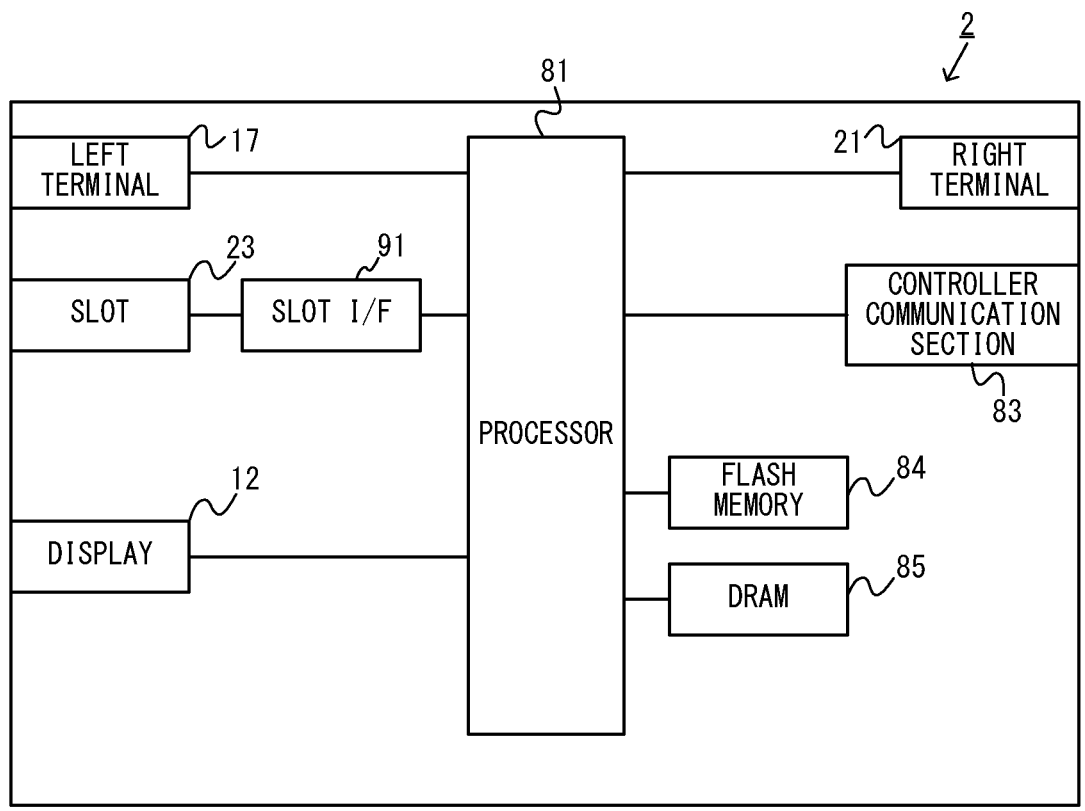
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81, 83 to 85, and 91 shown in FIG. 6 in addition to the components shown in FIG. 3. Some of the components 81, 83 to 85, and 91 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, and the right terminal 21. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. As described above, in the exemplary embodiment, the main body apparatus 2 can perform both wired communication and wireless communication with each of the left controller 3 and the right controller 4.

Further, the display 12 is connected to the processor 81. The processor 81 displays a generated image (e.g., an image generated by executing the above information processing) and/or an externally acquired image on the display 12.

Figure 7:
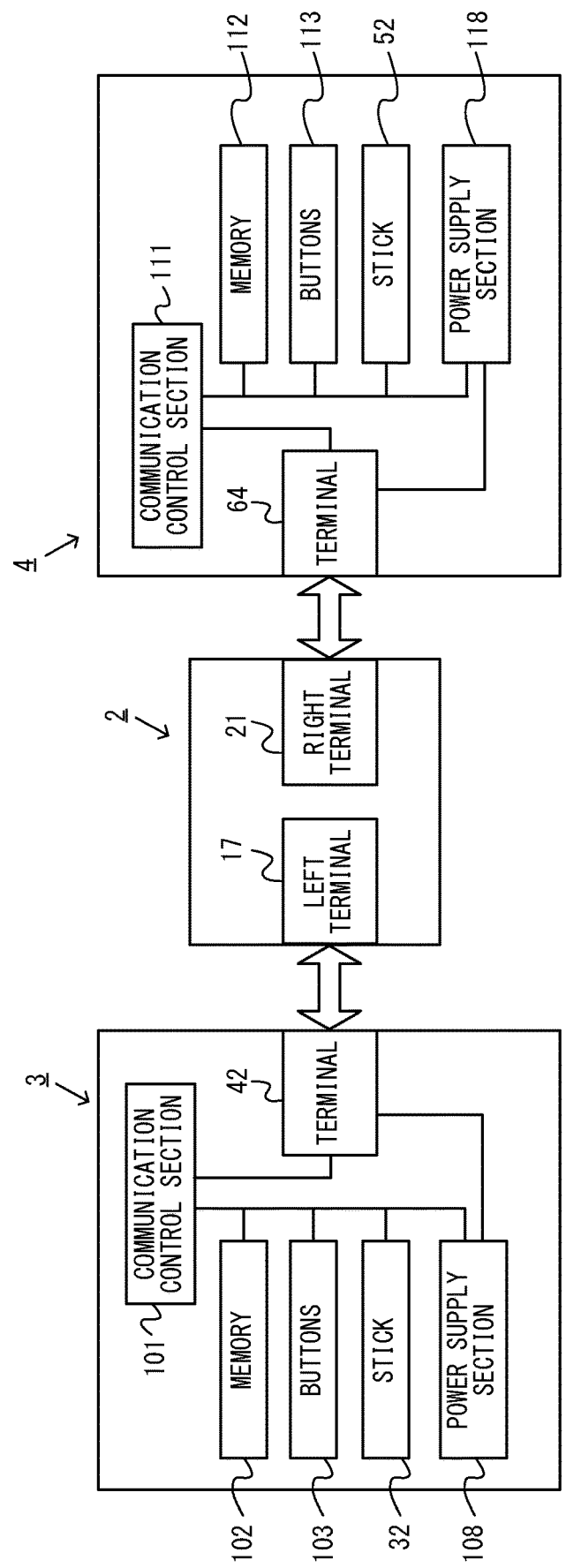
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

Hereinafter, an outline of information processing executed in the game system 1 will be described. In the exemplary embodiment, the game system 1 executes a game in which a plurality of characters including a player character operated by a player (or a user) appear in a virtual game space. In the game, a companion character that is a companion of the player character appears in addition to the player character. The player character defeats an enemy character in cooperation with the companion character to progress the game.

The companion character is a non-player character whose motion is automatically controlled by the game system 1. That is, the content of motion of the companion character is basically determined by the game system 1. In the exemplary embodiment, however, the player character can make an instruction to the companion character, and the companion character performs a predetermined skill motion according to the instruction by the player character. The skill motion is a motion using the skill of the companion character, and the specific content thereof is optional. For example, the skill motion may be a motion of attacking an enemy, or a motion of recovering or assisting an ally character (i.e., the player character or another companion character). In the exemplary embodiment, the skill motion to be performed according to the instruction by the player character is set for each companion character. In the exemplary embodiment, each companion character performs a skill motion unique to the companion character, according to the instruction by the player character.

[2-1. Process of Causing Companion Character to Perform Skill Motion]

Figure 8:
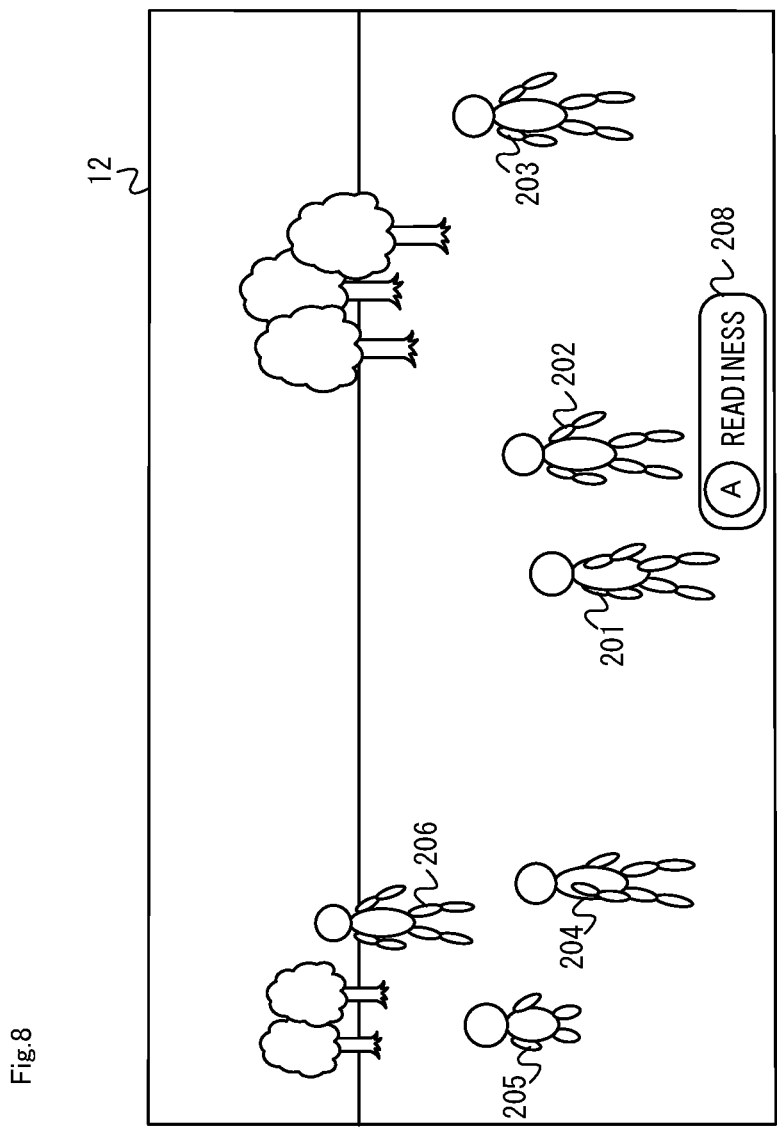
FIG. 8 shows an example of a game image when a player character causes a companion character to perform a skill motion.

Hereinafter, how the player character causes a companion character to perform a skill motion will be described with reference to FIG. 8 to FIG. 10. FIG. 8 shows an example of a game image in which the player character causes a companion character to perform a skill motion. As shown in FIG. 8, during the game, the game system 1 displays, on the display 12, a game image representing a game space around a player character 201. In the example shown in FIG. 8, the player character 201 and five companion characters 202 to 206 are placed in the game space. In the exemplary embodiment, as shown in FIG. 8, five companion characters 202 to 206 appear in the game space. The number of companion characters appearing in the game space is not limited.

In the example shown in FIG. 8, the player character 201 approaches the companion character 202. Approaching the companion character, the player character 201 can make a readiness instruction to the companion character. The readiness instruction instructs the companion character to enter a readiness state in which the companion character is ready to perform a skill motion. That is, the companion character becomes ready to execute the skill motion according to the readiness instruction having been performed.

In the exemplary embodiment, an action range is set in an area within a predetermined distance from the player character 201 in a forward direction from the player character 201 (see FIG. 15 described later). Although described in detail later, in the exemplary embodiment, the player character 201 can perform an action to an object (including a companion character) in the action range. This action is a motion according to the object. Examples of the action include a motion of making a readiness instruction to a companion character, and a motion of acquiring an item. When a companion character is positioned within the action range of the player character 201, the player character 201 can make a readiness instruction to the companion character.

Furthermore, as shown in FIG. 8, in the situation where the player character 201 can make a readiness instruction to the companion character 202, the game system 1 displays a readiness instruction image 208 indicating the readiness instruction together with the image of the game space. This notifies the player that he/she can make a readiness instruction. The readiness instruction image 208 is displayed near the player character 201 or the companion character 202, so that the player is notified of the companion character to be subjected to the readiness instruction. In addition, the readiness instruction image 208 includes an image indicating an operation input for the readiness instruction (here, an input of pressing the A-button 53 of the right controller 4). This notifies the player of the operation input for the readiness instruction.

According to the readiness instruction (i.e., the operation input for the readiness instruction) having been made in the situation shown in FIG. 8, the game system 1 sets the companion character 202 subjected to the readiness instruction, in the readiness state. FIG. 9 shows an example of the game image in the situation where the companion character 202 is in the readiness state. Here, the skill motion of the companion character 202 is to make a wind in the forward direction of the player character 201 from behind the player character 201. Therefore, the game system 1 causes the companion character 202 in the readiness state to perform a motion of moving behind the player character 201 (see FIG. 9). For example, the companion character 202, with the wind, can blow away an object placed in the game space, or can move the player character 201 using an item gliding in the air (i.e., the player character 201 moves in the air on the wind). When the companion character is in the readiness state, the game system 1 may display an effect image according to the skill motion, or may cause the companion character to perform a preparatory motion according to the skill motion, so that the user can recognize the content of the skill motion.

When the companion character is in the readiness state, the player character 201 can cause the companion character to perform the skill motion by making an execution instruction to the companion character. As shown in FIG. 9, in the situation where the companion character 202 is in the readiness state, the game system 1 displays an execution instruction image 209 indicating an execution instruction together with the image of the game space. This notifies the player that he/she can make the execution instruction. The execution instruction image 209 is displayed near the player character 201 or the companion character 202, so that the player is notified of the companion character to be subjected to the execution instruction. In addition, the execution instruction image 209 includes an image indicating an operation input for the execution instruction (here, an input of pressing the A-button 53 of the right controller 4). This notifies the player of the operation input for the execution instruction.

Figure 9:
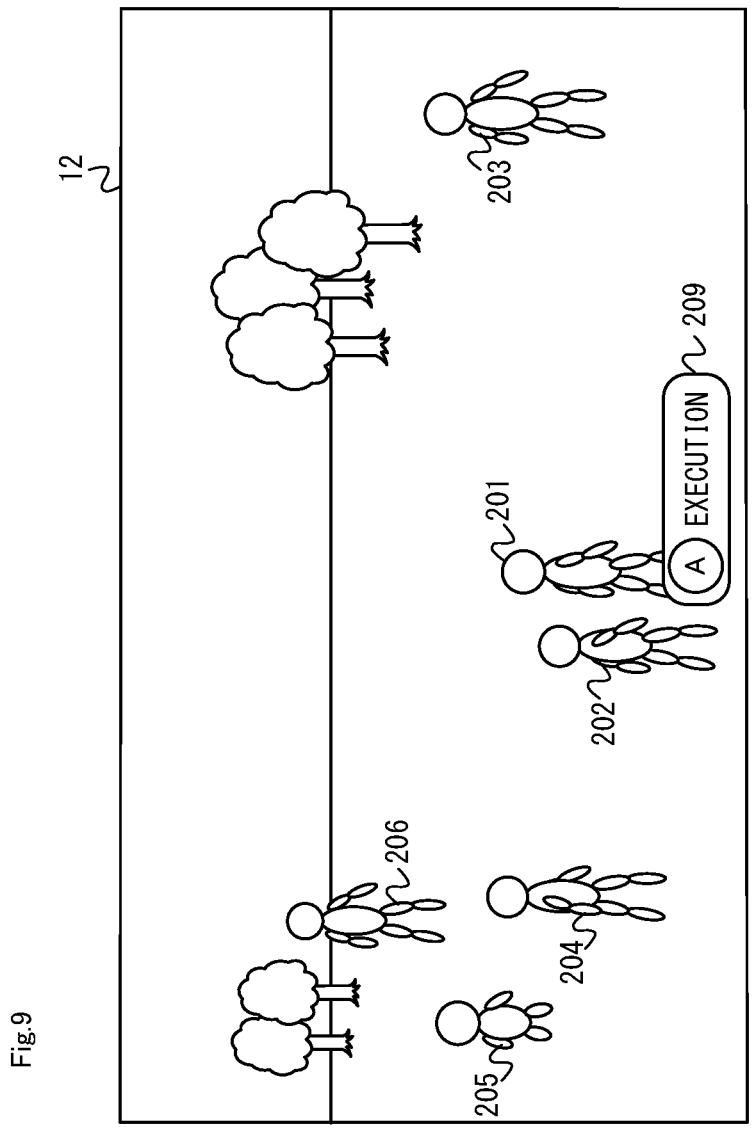
FIG. 9 shows an example of a game image in a situation where the companion character is in a readiness state.

According to the execution instruction (i.e., the operation input for the execution instruction) having been made in the situation shown in FIG. 9, the game system 1 causes the companion character 202 subjected to the execution instruction to perform the skill motion. FIG. 10 shows an example of the game image in the situation where the companion character 202 has performed the skill motion. In the example shown in FIG. 10, the companion character 202 performs the skill motion that makes a wind in the forward direction of the player character 201 according to the execution instruction. The player designates the direction of the wind by designating the orientation of the player character 201 through an operation of changing the orientation of the player character 201 (e.g., an operation to the analog stick 32 of the left controller 3), and makes the wind in the designated direction according to the execution instruction.

Figure 10:
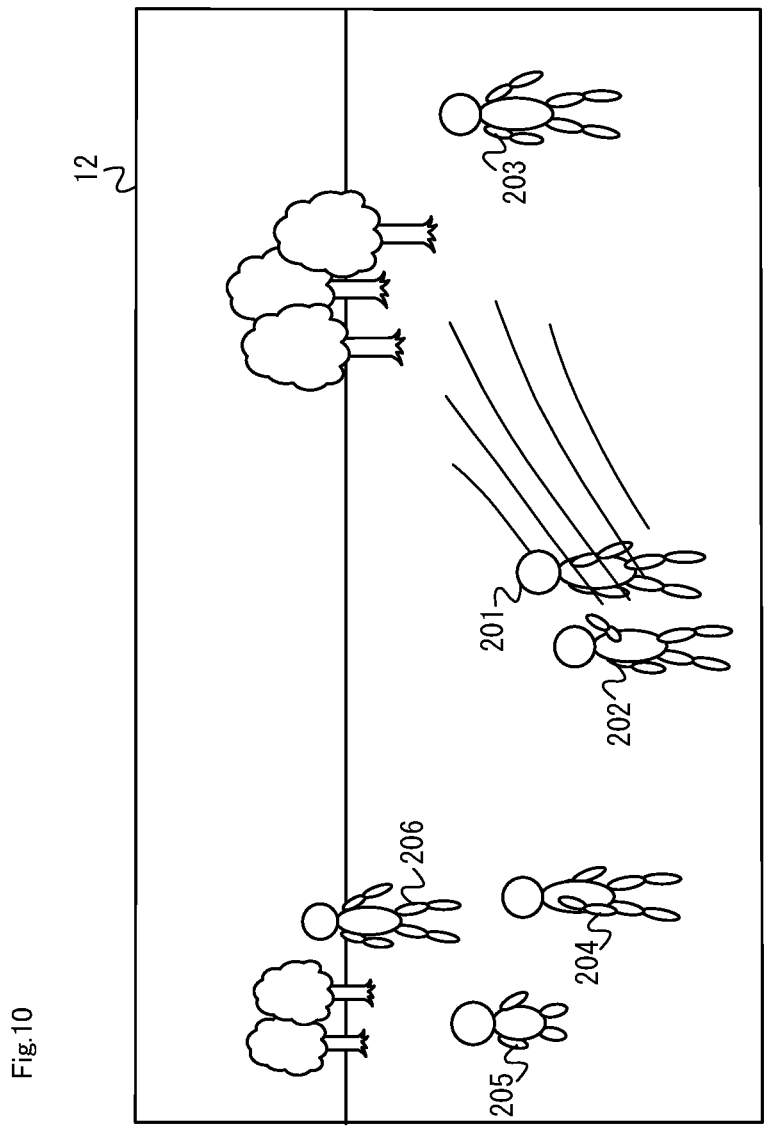
FIG. 10 shows an example of a game image in a situation where the companion character has performed a skill motion.

In the example shown in FIG. 10, the direction in which the companion character 202 performs the skill motion is designated by the player. As for another skill motion to be performed by another companion character different from the companion character 202, the player may be able to designate a target position due to the skill motion. For example, the skill motion may be a motion of performing a predetermined attack to a position designated by the player in the game space. Specifically, the skill motion may be as follows. That is, when the player character releases an arrow according to the operation performed by the player, the skill motion may be a motion of the companion character to perform a ranged attack to a position where the arrow has landed. The skill motion may be a motion of the companion character to perform an emission attack toward the direction in which the player character faces, according to the operation performed by the player. The skill motions to be performed by the respective companion characters may include a motion whose direction and position need not be designated. For example, a skill motion of a certain companion character may be a motion of attacking all characters around the companion character, or may be a motion of being combined with the player character.

In the example shown in FIG. 10, the operation input for making the execution instruction is the same as the operation input for making the readiness instruction, i.e., pressing the A-button 53 of the right controller 4. This allows the player to perform the readiness instruction and the execution instruction by the easy-to-understand operation, thereby improving the operability of the operation for causing the companion character to perform the skill motion. However, an operation input for making an execution instruction as to another skill motion may be different from an operation input for making a readiness instruction as to the another skill motion. For example, as for the skill motion of the companion character to perform the ranged attack to the position where the arrow has landed, an operation input for causing the player character to release the arrow also functions as an operation input for making an execution instruction. The operation input for releasing the arrow may be different from an input to the A-button 53.

As described above, according to the exemplary embodiment, the player character firstly makes the readiness instruction to the companion character, and then makes the execution instruction to the companion character that has entered the readiness state according to the readiness instruction, thereby causing the companion character to perform the skill motion. That is, when the operation input has been performed by the user in the state where a predetermined positional relationship indicating that the player character and the companion character are near to each other (specifically, the companion character is positioned in the action range) is satisfied, the game system 1 shifts the companion character to the readiness state for the control corresponding to the companion character (specifically, the control for causing the companion character to perform the skill motion). Then, when the companion character is in the readiness state, the game system 1 performs the above control toward a direction or a position designated by the user, according to an operation input, including designation of the direction or the position (specifically, an input composed of the input of designating the orientation of the player character and the input of making the execution instruction), having been performed. Since the player character needs to approach the companion character in order to achieve the predetermined positional relationship with the companion character, the player character may move in the direction toward the companion character. At this time, if the skill motion is immediately executed according to the operation input, the skill motion may be executed in the direction from the player character toward the companion character, for example, against the player's intention. In this regard, according to the above example, the player makes the readiness instruction and then makes the execution instruction with the direction or the position being designated. Therefore, for example, it is possible to reduce the possibility of an erroneous operation such as the skill motion being performed toward a direction or a position not intended by the player, or a skill motion being performed even through the player does not intend to cause the skill motion. Thus, the operability of the game can be improved.

The "operation input including designation of the direction or the position by the user" may be an input of designating the direction or the position. For example, at a time point when a predetermined time has elapsed from when the companion character was set in the readiness state according to the readiness instruction, the game system 1 may cause the companion character to perform the skill motion toward the direction (i.e., the orientation of the player character) designated at the time point. Moreover, the "operation input including designation of the direction or the position by the user" may be performed by an input for designating the direction or the position, and an input for canceling the input of making the readiness instruction. For example, after setting the companion character in the readiness state according to the input of pressing the A-button 53 (at this time, the A-button 53 is being pressed down), the game system 1, while receiving the input for designating the direction, may cause the companion character to perform the skill motion, in response to cancellation of pressing of the A-button 53, toward the direction designated at the time of the cancellation.

In other embodiments, the game system 1 may receive the execution instruction without receiving the readiness instruction. That is, the game system 1 may receive the execution instruction in the state where the companion character is positioned in the action range of the player character, and may cause the companion character to perform the skill motion when the execution instruction has been made by the player.

In the exemplary embodiment, after a companion character has performed a skill motion, the companion character cannot execute a skill motion again until a predetermined standby time elapses from the previous skill motion. That is, on the condition that the standby time has elapsed from execution of control for the skill motion corresponding to the companion character, the game system 1 allows the control to be executed again. This inhibits the player from causing the companion character to frequently perform the skill motion, thereby inhibiting the game from becoming too advantageous to the player. Moreover, immediately after a certain companion has been caused to perform a skill motion, only another companion character can be caused to perform a skill motion. This motivates the player to cause not only one companion character but also another companion character to perform the skill motion. Thus, the player can be motivated to progress the game in corporation with a plurality of companion characters. The respective companion characters may have the same standby time, or may have different standby times. Moreover, although not shown in the figures, if a companion character enters the action range of the player character before the standby time elapses after a skill motion, the game system 1 may display an image indicating a remaining time before elapse of the standby time regarding the companion character (e.g., a gauge indicating the remaining time).

In other embodiments, after a companion character has performed a skill motion, the game system 1 may cause this companion character to perform a skill motion again without waiting until the standby time elapses. Moreover, in other embodiments, the game system 1 may set a standby time for an execution instruction by the player character to any companion character, instead of setting a standby time for a skill motion of each companion character. That is, on the condition that the standby time has elapsed from when the player character made the execution instruction to any companion character, the game system 1 may permit the execution instruction by the player character to each companion character.

[2-2. Process of Controlling Movement of Companion Character]

Next, a process of controlling movement of each companion character will be described. In the exemplary embodiment, the game system 1 controls movements of the companion characters 202 to 206 according to movement of the player character 201. In the exemplary embodiment, the game system 1 can take at least one of an accompanying mode and a standby mode, as a control mode for controlling movements of the companion characters 202 to 206. In the accompanying mode, movements of the companion characters 202 to 206 are controlled so as to accompany the player character 201 according to movement of the player character 201. The standby mode is a control mode in which movement of a companion character is stopped to make the companion character stand by there. In the standby mode, the game system 1 performs a control for stopping movements of the companion characters 202 to 206 within a predetermined range including the player character 201 (reference range described later). Thus, the game system 1 can control movements of a plurality of companion characters. Moreover, the game system 1 is more likely to bring the player character 201 near to a desired companion character among the plurality of companion characters, which allows the player to easily make the instruction regarding the skill motion described above.

In other embodiments, the game system 1 may be able to control movements and the like of the companion characters 202 to 206 in a control mode different from the accompanying mode and the standby mode.

Figure 11:
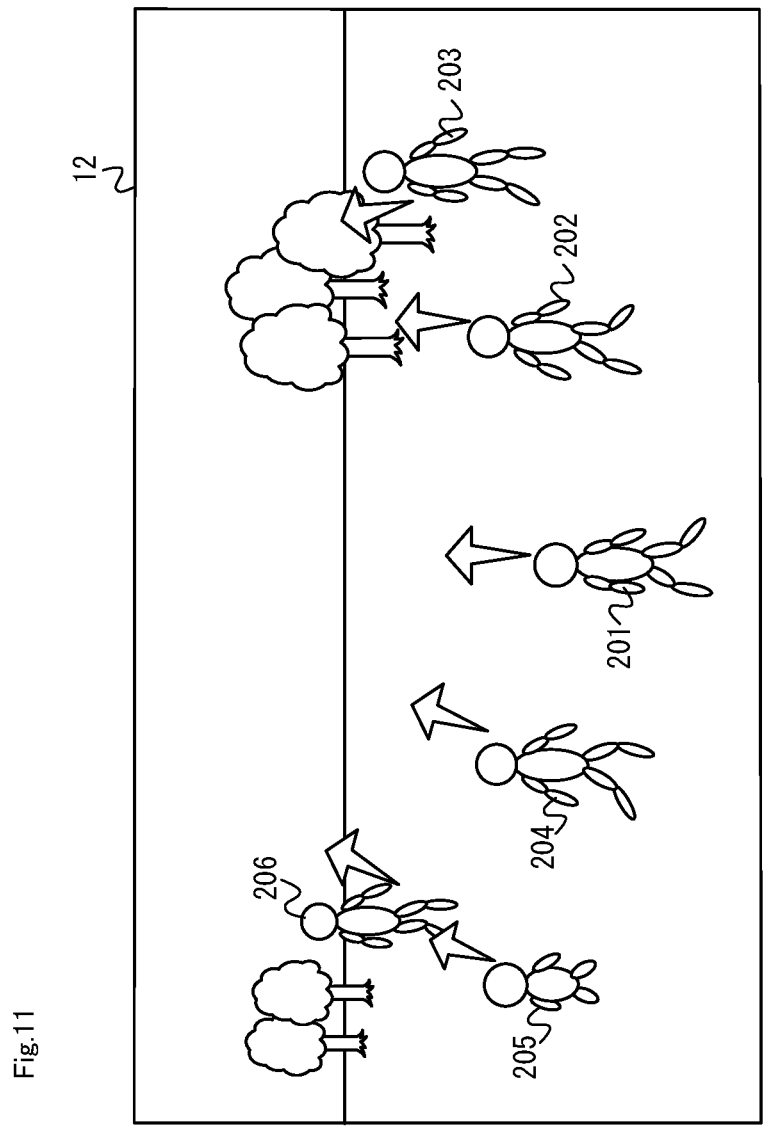
FIG. 11 shows an example of a game image when companion characters moving in an accompanying mode.

FIG. 11 shows an example of the game image when the companion characters 202 to 206 are moving in the accompanying mode. In the accompanying mode, the companion characters 202 to 206 move accompanying the player character 201 according to movement of the player character 201. Although described in detail later, the companion characters 202 to 206, near the player character 201, are controlled to move in roughly the same direction as the moving direction of the player character 201. In the example shown in FIG. 11, the player character 201 moves to the far side in the game image according to an operation input performed by the player. At this time, the companion characters 202 to 206 move to the far side in the game image according to the player character 201 moving to the far side (see arrows shown in FIG. 11).

The phrase "moving accompanying the player character" indicates a case where the companion character moves in roughly the same direction as the player character while being near the player character, but is not limited to a case where the companion character moves while being always positioned within a predetermined distance from the player character. In the accompanying mode, the companion character may move away from the player character for some reason (e.g., bypassing an obstacle). That is, in the case of "moving accompanying the player character", the positional relationship between the player character and the companion character may not necessarily be fixed. Moreover, in the case of "moving accompanying the player character", the companion character moves in roughly the same direction as the moving direction of the player character, but the moving direction of the companion character may not always exactly match the moving direction of the player character. For example, while the companion character is moving accompanying the player character, the game system 1 may move the companion character in a direction different from the moving direction of the player character, for the purpose of bypassing an obstacle, or making the movement of the companion character appear natural.

Figure 12:
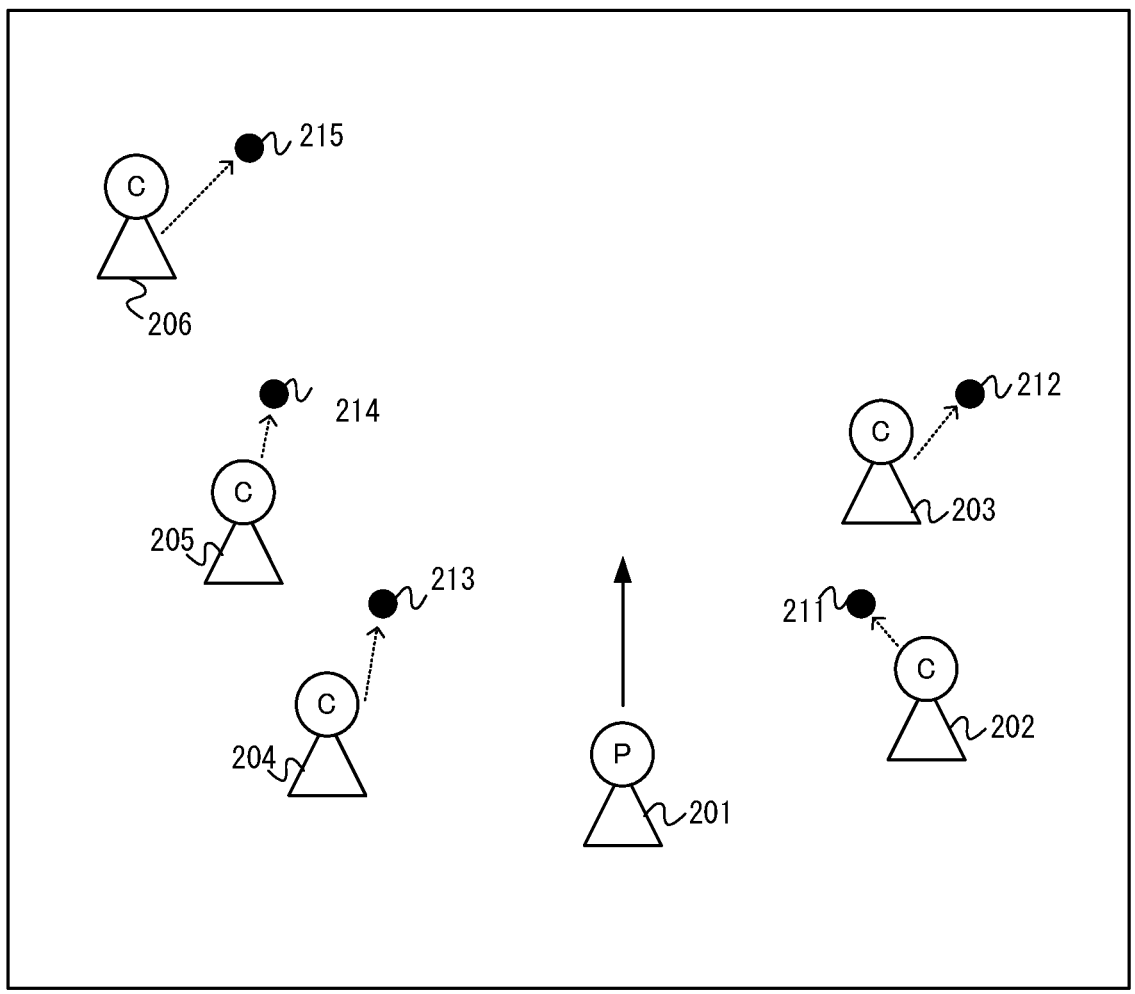
FIG. 12 shows an example of arrangement of the characters in the accompanying mode.

FIG. 12 shows an example of arrangement of the characters 201 to 206 in the accompanying mode. In the exemplary embodiment, the game system 1 sets target positions for the respective companion characters 202 to 206, and performs movement control by moving the companion characters 202 to 206 toward the target positions. In the accompanying mode, the game system 1 sets movement target positions 211 to 215 for the companion characters 202 to 206, respectively (see FIG. 12).

The movement target positions 211 to 215 are set based on the moving direction of the player character 201 (or the orientation of the player character 201) and the position of the player character 201. In the exemplary embodiment, the movement target positions 211 to 215 are respectively set at predetermined positions diagonally forward with respect to the moving direction of the player character 201 (see FIG. 12). In the example shown in FIG. 12, three movement target positions 213 to 215 out of the five movement target positions 211 to 215 are set to the left of the player character 201. However, depending on the situation of the game, the game system 1 may set three movement target positions out of the five movement target positions 211 to 215 to the right of the player character 201 (e.g., the movement target position 215 may be set forward of the movement target position 212, instead of being set forward of the movement target position 214). For example, in setting the movement target positions, if the number of companion characters positioned to the right of the player character 201 is greater than the number of companion characters positioned to the left of the player character 201, three movement target positions out of the five movement target positions 211 to 215 may be set to the right of the player character 201.

After setting the movement target positions as described above, the game system 1 sets a correspondence relationship between the companion characters and the movement target positions (i.e., the movement target positions toward which the respective companion characters should move). The correspondence relationship is set such that a plurality of companion characters are not associated with the same movement target position (i.e., such that the respective companion characters are associated with different movement target positions). In the exemplary embodiment, the game system 1 sets the correspondence relationship, based on the current positions of the respective companion characters and the movement target positions. Specifically, the correspondence relationship is set such that the distances between the respective companion characters and the corresponding movement target positions are minimized. For example, the game system 1 sets the correspondence relationship such that the total of the distances when the respective companion characters move to the corresponding movement target positions is minimized. Therefore, in the example shown in FIG. 12, the respective companion characters 202 to 206 are associated with the movement target positions nearest thereto, and the companion characters 202 to 206 move toward the movement target positions (see dotted-line arrows shown in FIG. 12). Thus, for example, the possibility that the companion characters 202 to 206 move crossing each other, can be reduced. Therefore, the companion characters 202 to 206 can be quickly moved to the corresponding movement target positions, and the behaviors of the moving companion characters 202 to 206 can be made natural.

The method for setting the correspondence relationship is optional. In other embodiments, the correspondence relationship may be fixed regardless of the positional relationship between the companion characters and the movement target positions. For example, the companion character 202 may be always associated with the movement target position 211 located diagonally forward right with respect to the player character 201, and may be controlled so as to always move toward the movement target position 211.

After setting the correspondence relationship between the companion characters and the movement target positions, the game system 1 moves the respective companion characters 202 to 206 toward the corresponding movement target positions. The game system 1 moves the companion characters toward the movement target positions, and may not necessarily cause the companion characters to reach the movement target positions. For example, the game system 1 may move the companion characters toward the movement target positions with an upper limit being set for the moving speed. In the exemplary embodiment, the game system 1 sets a moving speed of a companion character as follows. That is, if the companion character can reach the corresponding movement target position at a speed equal to or lower than an upper-limit speed, the moving speed of the companion character is set to this speed, whereas, if the companion character cannot reach the movement target position, the moving speed of the companion character is set to the upper-limit speed. In the exemplary embodiment, in order to make the companion character readily reach the movement target position, the upper-limit speed is set to a speed higher than the upper limit of the moving speed of the player character 201. The upper-limit speeds of the respective companion characters may be the same or different from each other. The upper-limit speed of each companion character may not necessarily be constant, and may be controlled to be varied depending on the game situation.

In the accompanying mode, the game system 1 repeatedly executes, for each predetermined time (specifically, 1 frame time), the process of setting the movement target positions and the process of moving the companion characters 202 to 206 toward the movement target positions. That is, the movement target positions are set while being successively changed according to the movement of the player character 201, and the companion characters 202 to 206 move toward the movement target positions being successively changed. Thus, in the accompanying mode, the companion characters 202 to 206 move accompanying the player character 201. For example, when the player character 201 advances straight, the movement target positions are set so as to move in the same direction as the advancing direction of the player character 201, so that the positional relationship with respect to the player character 201 is not changed. As a result, the companion characters 202 to 206 also move in the same direction as the advancing direction of the player character 201. Although the positional relationship between the player character 201 and the movement target positions is not changed as described above, the correspondence relationship between the movement target positions and the companion characters may sometimes be changed depending on the arrangement of the companion characters.

As described above, in the exemplary embodiment, the movement target positions 211 to 215 are set forward of the player character 201 (see FIG. 12). Thus, the game system 1 moves a companion character according to movement of the player character 201 such that the companion character is positioned forward of the player character 201 when the player character 201 faces forward and moves forward. That is, in the accompanying mode, the companion characters 202 to 206 precede the player character 201 when moving. Therefore, in the accompanying mode, if a virtual camera for generating a game image is set to face the forward direction of the player character 201, the companion characters 202 to 206 are likely to be included in the field-of-view range of the virtual camera. As a result, the game image including the companion characters 202 to 206 (see FIG. 11) is likely to be generated. This allows the player to easily grasp the positions of the companion characters 202 to 206 in the accompanying mode. In other embodiments, the companion characters 202 to 206 in the accompanying mode may be arranged in any way, and some companion characters may be controlled to follow the player character 201 when moving.

In the exemplary embodiment, the player character 201 and the companion characters 202 to 206 are arranged in a V shape as seen from above (see FIG. 12). That is, since the characters 201 to 206 are placed at different positions with respect to the left-right direction, the characters 201 to 206 are not overlapped and are easily viewable if the virtual camera is set to face the forward direction of the player character 201. The phrase "arranged in a V shape" is not limited to a case where the characters 201 to 206 are arranged in an exact V shape, but includes a case where the characters 201 to 206 are arranged so as to roughly extend sideways in the forward direction.

The companion characters may not necessarily be always positioned forward of the player character in the accompanying mode. As described above, a companion character may move away from the player character for some reason (e.g., bypassing an obstacle), and in this case, the companion character may be positioned backward of the player character.

Moreover, in the accompanying mode, if a companion character is distant from the player character, the game system 1 may relocate (or teleport) the companion character to a position near the player character. For example, when the companion character is a predetermined distance or more distant from the player character, the game system 1 may cause the companion character to temporarily withdraw from the game space, and then may relocate the companion character to a position near the player character. This allows the companion character positioned distant from the player character to quickly reach the movement target position. When relocating the companion character as described above, the game system 1 may set a position outside the field-of-view range of the virtual camera, as a position to which the companion character is relocated. In this case, the possibility that the player feels discomfort due to the companion character suddenly appearing near the player character, can be reduced.

Figure 13:
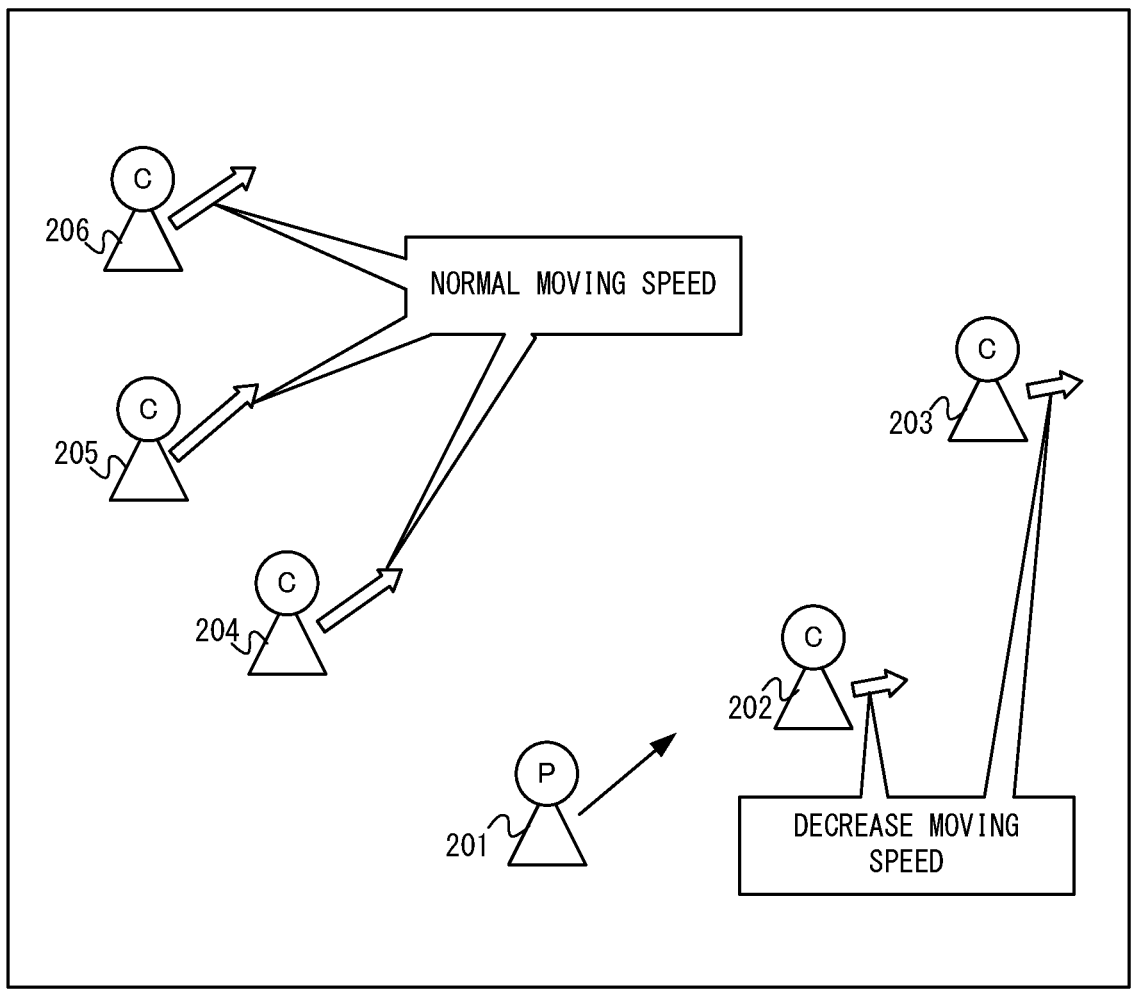
FIG. 13 shows an example of the characters when the player character has changed a moving direction in the accompanying mode.

FIG. 13 shows an example of arrangement of the characters 201 to 206 when the player character 201 has changed the moving direction in the accompanying mode. The example shown in FIG. 13 represents a situation where the player character 201, which has been moving upward in FIG. 13, changes the moving direction to a direction toward the companion characters 202 and 203. In the example shown in FIG. 13, since the player character 201 has been moving upward in FIG. 13 just before the direction change, the companion characters 202 to 206 are placed at the upper side in FIG. 13 relative to the player character 201.

As shown in FIG. 13, when the player character 201 moves toward the companion characters 202 and 203 in the accompanying mode, it is assumed that the player intends to bring the player character 201 near to the companion character 202 or 203 and make an instruction regarding a skill motion to the companion character 202 or 203. Meanwhile, in the accompanying mode, since the companion characters 202 to 206 move toward the movement target positions based on the moving direction of the player character 201, even when the player character 201 moves toward the companion characters 202 and 203, the companion characters 202 and 203 move in a direction away from the player character 201. As a result, the player character 201 cannot easily catch up with the companion characters 202 and 203, and cannot easily make the instruction regarding the skill motion to the companion character 202 or 203.

Therefore, in the exemplary embodiment, when the player character 201 moves toward a companion character, the game system 1 reduces the moving speed of the companion character so that the player character 201 is more likely to approach the companion character. In the example shown in FIG. 13, the game system 1 reduces the moving speed of the companion characters 202 and 203 toward which the player character 201 approaches (see an arrow shown in FIG. 13). Thus, the player character 201 can easily catch up with the companion characters 202 and 203.

In the example shown in FIG. 13, the moving speed of the other companion characters 204 to 206 is not reduced, and the moving speed set by the ordinary method described above is maintained (i.e., if a companion character can reach the corresponding movement target position at a speed equal to or lower than an upper-limit speed, the moving speed is set to this speed, whereas, if the companion character cannot reach the movement target position, the moving speed is set to the upper-limit speed). When the player character 201 has changed the moving direction as shown in FIG. 13, the movement target positions of the companion characters 204 to 206 may be significantly changed and be distant from the corresponding companion characters. However, if the upper-limit speed of the companion characters 204 to 206 is set to be higher than the moving speed of the player character 201, the moving speed of the companion characters 204 to 206 becomes higher than the moving speed of the player character 201, and therefore, in the above case, the companion characters 204 to 206 can reach the movement target positions.

As described above, in the exemplary embodiment, when the player character moves toward a companion character while the companion character is moving in the accompanying mode, the game system 1 makes the moving speed of the companion character lower than the moving speed of the player character. Thus, the player character can easily catch up with the companion character, and therefore can easily make an instruction to the companion character also in the accompanying mode. In other embodiments, the game system 1 may not necessarily execute the process of changing the moving speed of a companion character depending on whether or not the player character is moving toward the companion character.

The specific method for determining whether or not the player character is moving toward a companion character is optional. For example, the game system 1 determines that the player character is moving toward the companion character when an angle formed by the moving direction of the player character and a line extending from the player character to the companion character is smaller than a predetermined angle, and determines that the player character is not moving toward the companion character when the angle is equal to or greater than the predetermined angle.

The phrase "making the moving speed of the companion character lower than the moving speed of the player character" includes cases of: changing the moving speed of the companion character to a speed lower than a normal upper-limit value of the moving speed of the player character; changing an upper-limit value of the moving speed of the companion character to be lower than that in the normal state; and changing the moving speed of the companion character to a speed lower than the current moving speed of the player character. Moreover, the phrase "making the moving speed of the companion character lower than the moving speed of the player character" includes a case of changing the moving speed of the companion character to 0 (i.e., stopping the movement of the companion character). The moving speed of the player character may be controlled to be changed by an operation input performed by the player (e.g., according to the degree of tilting of the analog stick 32 of the left controller 3).

Figure 14:
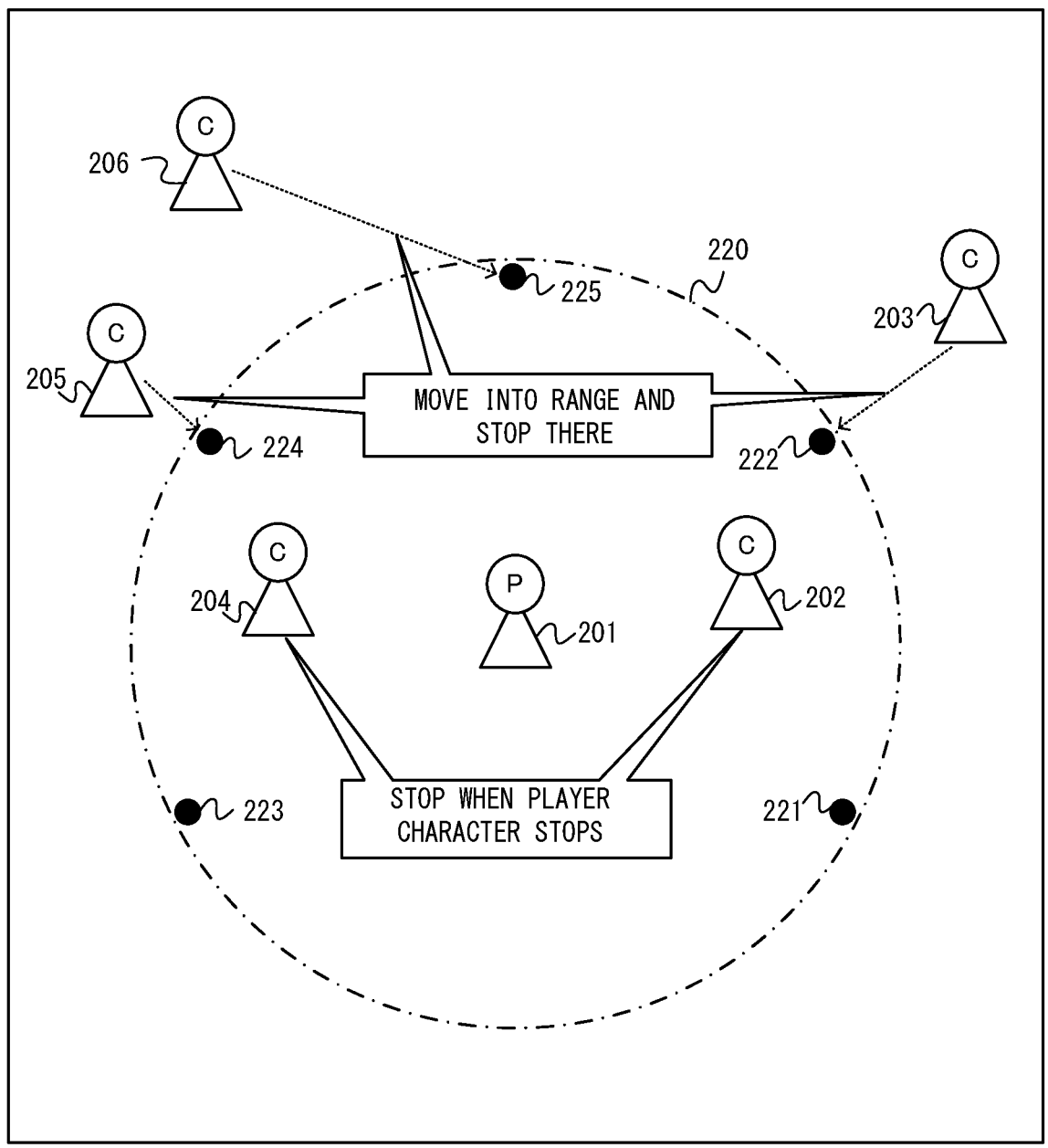
FIG. 14 shows an example of arrangement of the characters in a standby mode.

FIG. 14 shows an example of arrangement of the characters 201 to 206 in the standby mode. In the exemplary embodiment, at a time point when movement of the player character 201 has stopped in the accompanying mode, the game system 1 shifts the control mode from the accompanying mode to the standby mode. In the standby mode, the companion characters 202 to 206 having moved in the accompanying mode are controlled to stop in a reference range 220 based on the player character 201.

Also in the standby mode, as in the accompanying mode, the game system 1 sets target positions for the companion characters 202 to 206. Specifically, in the standby mode, stop target positions 221 to 225 are set for the companion characters 202 to 206 (see FIG. 14). The companion characters 202 to 206 are controlled to move to and stop at the stop target positions 221 to 225 under certain conditions.

In the exemplary embodiment, in the standby mode, the game system 1 sets the reference range 220 based on the position of the player character 201. Specifically, the reference range 220 is a range within a first distance from the position of the player character 201 (see FIG. 14). As shown in FIG. 14, the stop target positions 221 to 225 are located within the reference range 220.

As described above, in the exemplary embodiment, the game system 1 sets a stop target position, which is a target position where a companion character stops moving according to stop of movement of the player character, within the reference range based on the position at which the player character has stopped moving. Thus, the companion character is placed around the player character that has stopped moving, whereby the player character is more likely to approach the companion character. Therefore, the player can easily make an instruction regarding a skill motion to the companion character.

In the exemplary embodiment, the stop target positions 221 to 225 are set around the circumference of the reference range 220. For example, the stop target positions 221 to 225 are set such that parts of additional ranges described later, which are set based on the positions of the companion characters 202 to 205 when the companion characters 202 to 205 are respectively located at the stop target positions 221 to 225, are outside the reference range 220 (see FIG. 16). However, in other embodiments, the stop target positions 221 to 225 may be set at any positions within the reference range 220. Moreover, in other embodiments, the stop target positions 221 to 225 may be set at positions outside the reference range 220.

As shown in FIG. 14, in the exemplary embodiment, the stop target positions 221 to 225 are set so as to surround the player character 201. Specifically, the stop target positions 221 to 225 are set at the right rear side, the right front side, the left rear side, the left front side, and the front side with respect to the player character 201, respectively. That is, when there are three or more stop target positions, the stop target positions are set such that the player character 201 is placed inside a polygon having the stop target positions as vertices. Therefore, the game system 1, according to stop of movement of the player character 201, stops movements of a plurality of companion characters 202 to 206 at the positions where the player character 201 is surrounded by the companion characters 202 to 206. Thus, the companion characters 202 to 206 are placed with a positional relationship that allows the player character 201 to be more likely to approach any of the companion characters 202 to 206, and therefore, the player can easily make an instruction regarding a skill motion to any of the companion characters 202 to 206. Moreover, since the companion characters are likely to be arranged at intervals, a plurality of companion characters are not likely to be simultaneously included in the action range of the player character 201. If a plurality of companion characters are simultaneously included in the action range of the player character 201, there is a possibility that the player makes an instruction regarding a skill motion to an unintended companion character. The stop target positions 221 to 225 being set as described above can reduce the possibility.

In the exemplary embodiment, the game system 1 sets the stop target positions 221 to 225 such that two stop target positions are not simultaneously located within the action range. More specifically, the game system 1 sets the stop target positions 221 to 225 such that the distance between any two stop target positions becomes longer than the width of the longest part of the action range. Thus, the possibility that the player makes an instruction regarding a skill motion to an unintended companion character, can be reduced more reliably.

The companion characters 202 to 206 may be stopped at any positions in the standby mode. The companion characters 202 to 206 may not necessarily be stopped so as to surround the player character 201. For example, in other embodiments, the companion characters 202 to 206 may be stopped at positions forward of the player character 201. Moreover, in other embodiments, the stop target positions 221 to 225 may be set such that two stop target positions can be simultaneously located within the action range.

After setting the stop target positions as described above, the game system 1 sets a correspondence relationship between the companion characters and the stop target positions (i.e., the stop target positions toward which the respective companion characters should move). The correspondence relationship between the companion characters and the stop target positions may be set similarly to the case of setting the correspondence relationship between the companion characters and the movement target positions described above. That is, the game system 1 sets the correspondence relationship such that the distances between the respective companion characters and the corresponding stop target positions are minimized.

The method for setting the correspondence relationship between the companion characters and the stop target positions is optional. The method for setting the correspondence relationship between the companion characters and the stop target positions may be different from the method for setting the correspondence relationship between the companion characters and the movement target positions. For example, in other embodiments, the correspondence relationship between the companion characters and the stop target positions may be fixed regardless of the positional relationship between the companion characters and the stop target positions.

In the exemplary embodiment, the game system 1 sets the stop target positions 221 to 225 at the time of starting the standby mode (i.e., at the time when the player character 201 has stopped moving).

After setting the correspondence relationship between the companion characters and the stop target positions, the game system 1 controls movements of the companion characters 202 to 206, based on the stop target positions. In the example shown in FIG. 14, the game system 1 moves the companion characters 203, 205, and 206 positioned outside the reference range 220, among the companion characters 202 to 206, to the corresponding stop target positions, and stops these companion characters 203, 205, and 206 there. Thus, in the standby mode, the companion characters 203, 205, and 206 stop within the reference range 220. For example, in the case where the companion characters 203, 205, and 206 are arranged as shown in FIG. 14 because the player character 201 has stopped while the companion characters 203, 205, and 206 are positioned near the movement target positions that are set forward of the player character 201 in the accompanying mode, the companion characters 203, 205, and 206 are positioned outside the reference range 220 at the time of entry to the standby mode, and therefore, the companion characters 203, 205, and 206 move to the stop target positions 222, 224, and 225, respectively, and stop there.

As described above, in the exemplary embodiment, in the case where a companion character is positioned outside the reference range when the player character has stopped moving, the game system 1 moves the companion character into the reference range 220 and stops the companion character there. Thus, the companion character can be placed around the player character that has stopped moving, whereby the player can easily make an instruction regarding a skill motion to the companion character. In other embodiments, the control method for stopping the companion character according to the player character that has stopped moving is optional, and the game system 1 may stop the companion character at a position outside the reference range 220.

As described above, in the case where the companion character is positioned outside the reference range at the time of shifting to the standby mode, the companion character basically stops at the stop target position within the reference range 220. However, if an object to which the player character can perform an action (referred to as "action target object") is placed near the stop target position, the companion character stops at a position different from the stop target position.

Figure 15:
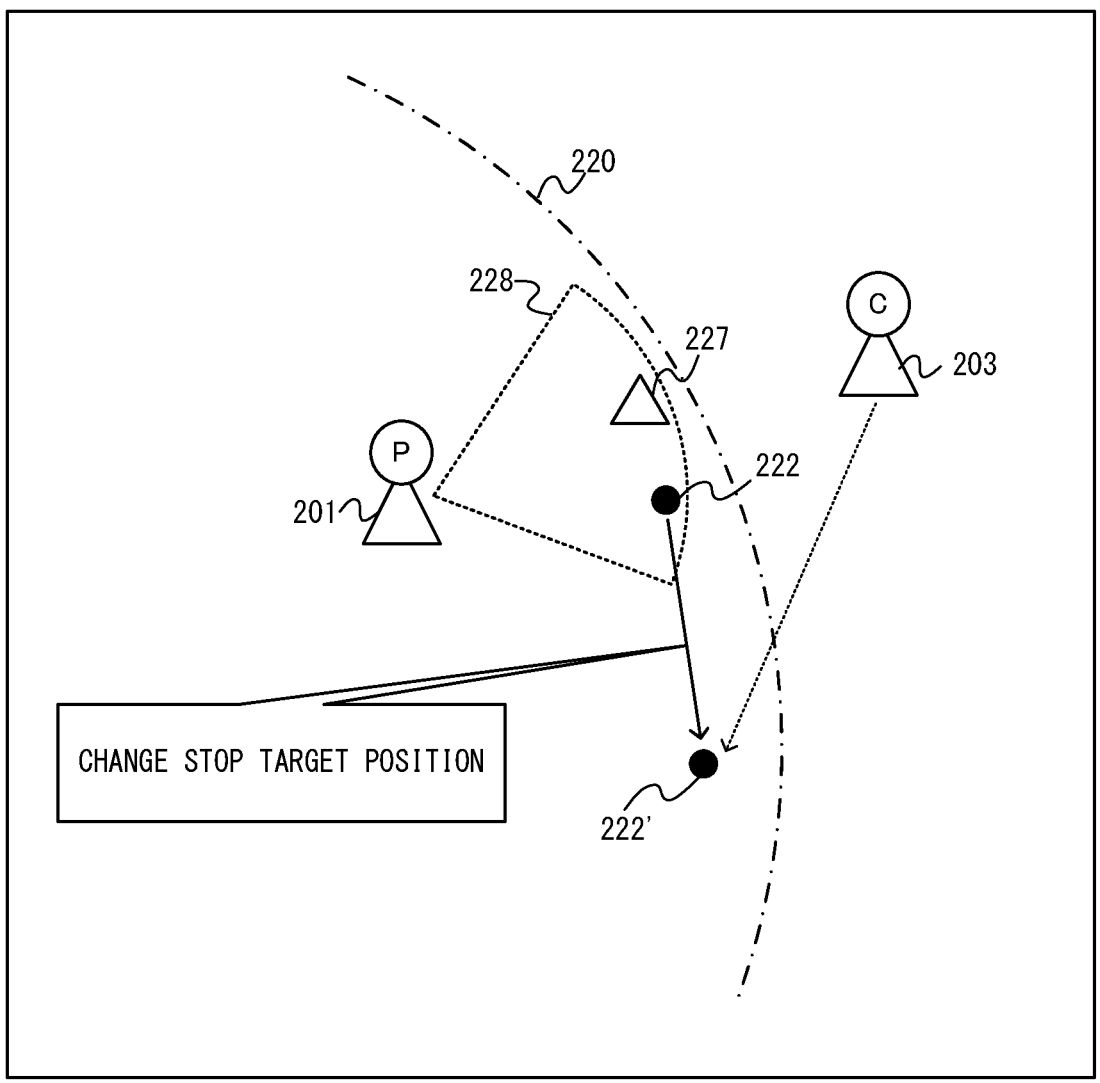
FIG. 15 shows an example of a state where an action target object is placed near the player character.

FIG. 15 shows an example of a state where an action target object 227 is placed near the player character 201. Examples of the action target object 227 include: an item that the player character 201 can acquire; a door that the player character 201 can open; and a non-player character (different from the companion character) that the player character 201 can talk to. Furthermore, as described above, the game system 1 sets an action range 228 based on the position and the orientation of the player character 201. In the exemplary embodiment, the action range 228 is a range within a predetermined distance from the player character 201 and having a predetermined angle to the right and the left with respect to the forward direction of the player character 201 (see FIG. 15). The action range 228 may have any shape and size.

When the action target object 227 is placed within the action range 228 of the player character 201, the player character 201 performs an action to the action target object 227 according to a predetermined operation input performed by the player. The action is predetermined for each action target object. For example, when the action target object is an item, the player character 201 performs an action to acquire this item. When the action target object is the non-player character described above, the player character 201 performs an action to talk to this non-player character. In the exemplary embodiment, the predetermined operation input is the same as the operation input for performing the readiness instruction, and specifically, is an input of pressing the A-button 53 of the right controller 4.

In the example shown in FIG. 15, the action target object 227 is placed in the game space, and the stop target position 222 corresponding to the companion character 203 is set near the action target object 227. In the example shown in FIG. 15, for example, when the player character 201 approaches the action target object 227 to perform an action to the action target object 227, the stop target position 222 is included in the action range 228 of the player character 201. Therefore, if the companion character 203 is positioned at the stop target position 222, both the action target object 227 and the companion character 203 are included in the action range 228 in the situation shown in FIG. 15. In this case, for example, the game system 1 adopts, as an action target, one of the objects included in the action range 228. For example, the object nearest to the player character 201 is adopted as an action target. Therefore, if the player wants the action target object 227 to be an action target, the player needs not only to simply move the player character 201 so that the action target object 227 is included in the action range 228, but also to move the player character 201 so that the action target object 227 is nearer to the player character 201 than the companion character 203 or move the player character 201 to a position or in a direction so that the companion character 203 is not included in the action range 228.

Therefore, in the exemplary embodiment, in the case where the stop target position 222 corresponding to the companion character 203, which is positioned outside the reference range at the time of shifting to the standby mode, is set near the action target object 227, the game system 1 stops the companion character 203 at a position distant from the action target object 227. Specifically, the game system 1 stops the companion character 203 at a position 222' (which may be within the reference range 220) so that the companion character 203 is not included in the action range 228 in the state where the action target object 227 is positioned within the action range 228. That is, the game system 1 changes the stop target position corresponding to the companion character 203 to the position 222', whereby the companion character 203 is moved to the position 222' and stopped there. It can be said that the position 222' is a position at which the distance between the action target object 227 and the companion character 203 is longer than the width of the longest part of the action range 228. Thus, it is possible to make the situation where the player character 201 can perform actions to both the action target object 227 and the companion character 203, not likely to occur, and therefore, the player can easily perform an operation of causing the player character 201 to perform these actions.

While the companion character positioned outside the reference range at the time of shifting to the standby mode is moving toward the stop target position, if an action target object newly appears near the stop target position, the game system 1 changes the stop target position to a position distant from the action target object. Thus, even when the action target object newly appears near the stop target position after the shifting to the standby mode, the player can easily perform the operation of causing the player character to perform an action to the companion character or the action target object.

In the example shown in FIG. 14, among the companion characters 202 to 206, the companion characters 202 and 204 positioned within the reference range 220 at the time of entry to the standby mode, do not move to the stop target positions but stop moving there (i.e., at the positions at the time of entry to the standby mode). Thus, in the case where a companion character is positioned within the reference range 202 when the player character 201 has stopped moving, the game system 1 stops movement of the companion character regardless of whether or not the companion character is at the stop target position. For example, in the case where the companion characters 202 and 204 are placed as shown in FIG. 14 because the player character 201 has stopped in the state where the companion characters 202 and 204 have not yet reached the movement target positions set forward of the player character 201 in the accompanying mode, the companion characters 202 and 204 having been positioned near the player character 201 are positioned within the reference range 220 at the time of entry to the standby mode, and therefore, the companion characters 202 and 204 stop there without moving to the stop target positions 221 and 223.

If a companion character continues moving near the player character 201 that has stopped moving, this companion character may take a behavior of moving away from the player character 201 that has stopped moving, and such a behavior of the companion character may make the player feel discomfort. Meanwhile, in the exemplary embodiment, a companion character, which is already near the player character 201 (i.e., positioned within the reference range 220) that has stopped moving, is immediately caused to stop moving, thereby reducing the possibility described above.

In the case where the action target object is placed near the companion character positioned within the reference range at the time of entry to the standby mode, the game system 1 stops the companion character at a position distant from the action target object. That is, in the above case, the game system 1 moves the companion character from the position at the time of entry to the standby mode to the position distant from the action target object, and stops the companion character there. The stop position may be determined in the same manner as in the case of determining a stop position for the companion character 203 (position 222' in FIG. 15) in the example shown in FIG. 15. Thus, even when the action target object is placed near the companion character positioned within the reference range at the time of entry to the standby mode, the player can easily perform an operation of causing the player character to perform an action to the companion character or the action target object.

In the standby mode, the companion characters 202 to 206 stop moving within the reference range 220 as described above. While movement of a companion character is stopped in the standby mode, the game system 1 may cause the companion character to perform a motion without movement, such as swinging the body or walking on the spot. This makes the behavior of the companion character natural.

Figure 16:
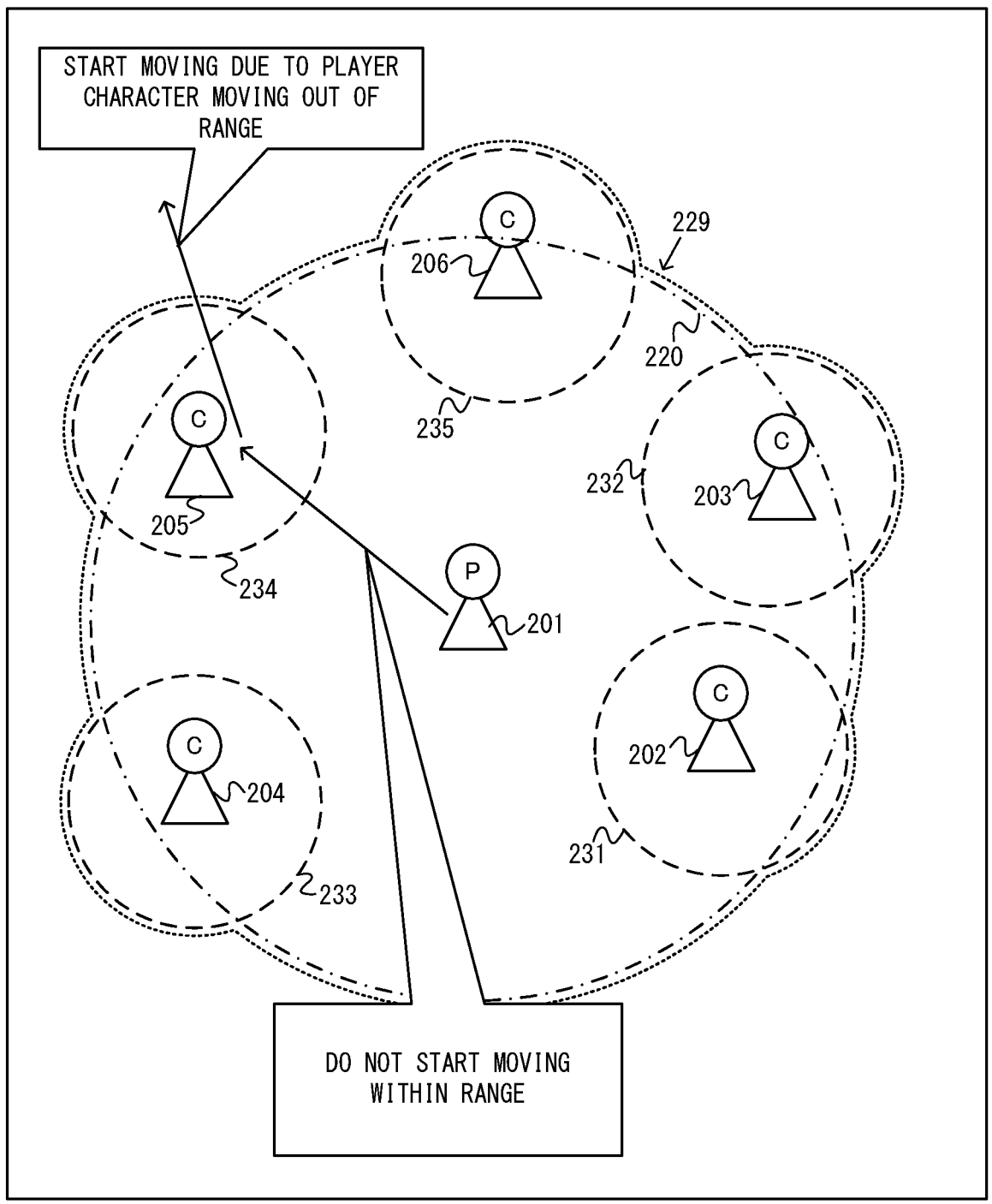
FIG. 16 shows an example of arrangement of the characters in the standby mode.

FIG. 16 shows an example of arrangement of the characters 201 to 206 in the standby mode. In the exemplary embodiment, even if the player character 201 resumes moving in the standby mode, the game system 1 does not resume the accompanying mode immediately after the movement, and shifts the control mode from the standby mode to the accompanying mode in response to the player character 201 moving out of a predetermined stop range 229. That is, while the player character 201 is moving within the stop range 229, the game system 1 does not shift the control mode from the standby mode to the accompanying mode, and the control mode is maintained in the standby mode (see FIG. 16). Although described in detail later, the stop range 229 is a range including the reference range 220 (see FIG. 16). Therefore, in the standby mode, the companion characters 202 to 206 are positioned within the stop range 229. Thus, in the standby mode, for example, shifting to the accompanying mode is not performed even if the player character 201 moves approaching a companion character to make an instruction regarding a skill motion, and therefore, the companion character does not move. Therefore, the player character 201 is more likely to approach the desired companion character, and easily make an instruction regarding a skill motion to the companion character.

Meanwhile, in response to the player character 201 moving out of the stop range 229, the game system 1 shifts the control mode from the standby mode to the accompanying mode (see FIG. 16). After the shifting to the accompanying mode, the game system 1 resumes control for moving the companion characters 202 to 206 so as to accompany the player character 201.

In the exemplary embodiment, the stop range 229 is a range including: the reference range 220 that is set at the time of starting the standby mode; and additional ranges 231 to 235 based on the positions of the companion characters 202 to 206. Specifically, the stop range 229 is a range that is an inner side of at least one of the reference range 220 and the additional ranges 231 to 235. The additional ranges 231 to 235 are ranges within a second distance from the positions of the companion characters 202 to 206, respectively. For example, the second range is set to be shorter than the first distance that is the radius of the reference range 220. Therefore, the circumference of the stop range 229 is composed of parts of the circumference of the reference range 220, and parts of the circumferences of the additional ranges 231 to 235 (however, in FIG. 16, the circumference of the stop range 229 is shown slightly outward with respect to the circumferences of the reference range 220 and the additional ranges 231 to 235 in order to make the stop range 229 easily viewable).

For example, it is conceivable that, when the player character 201 approaches a companion character to perform the readiness instruction, the player character 201 may go past and move out of the reference range 220. If it is assumed that the stop range 229 is the same as the reference range 220, in the above case, the player character 201 moves out of the stop range 229 against the player's intention. As a result, the companion character starts moving due to shifting from the standby mode to the accompanying mode, which makes it difficult for the player character 201 to make an instruction to the companion character. Therefore, in the exemplary embodiment, the stop range 229 including the reference range 220 and the additional ranges 231 to 235 is set, whereby the player character 201 is prevented from easily moving out of the stop range 229 in the above case. Thus, the possibility that the player character 201 moves out of the stop range 229 against the player's intention, is reduced, and the player character 201 can easily make an instruction to the companion character.

In other embodiments, the stop range 229 may have any shape and size, and the stop range 229 may be set to be the same as the reference range 220.

Determination as to whether or not the player character is positioned within the stop range may be performed by a process of setting the stop range, and determining whether or not the player character is positioned within the set stop range, or may be performed by a process of, without directly setting a stop range, determining whether or not the player character is positioned within at least one of the reference range and the additional ranges. It can be said that the latter process is a process of substantially performing the above determination based on the stop range.

As described above, in the exemplary embodiment, the reference range is used for determining whether or not to stop a non-player character on the spot at the time of shifting to the standby mode. In other embodiments, the game system 1 may perform the above determination by using a stop determination range different from the reference range.

Figure 17:
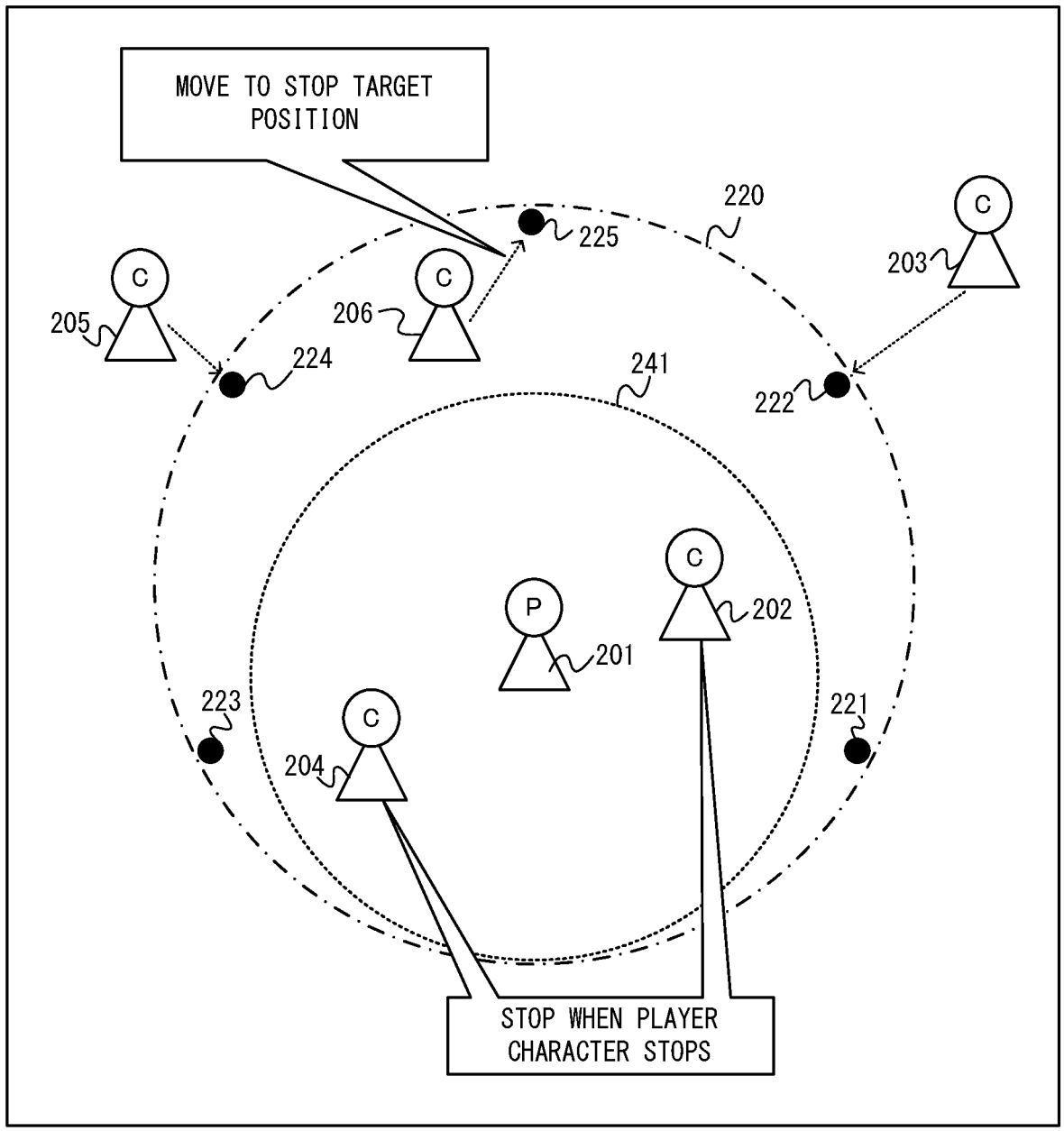
FIG. 17 shows an example of a stop determination range.

FIG. 17 shows an example of the stop determination range. In the example shown in FIG. 17, a stop determination range 241 is a range within the reference range 220. That is, the stop determination range 241 is smaller than the reference range 220, and the entirety thereof is included in the reference range 220. Specifically, in the example shown in FIG. 17, the reference range 220 is a circular area centering around a position that is a predetermined distance separated forward from the position of the player character 201 at the time of shifting to the standby mode. The stop determination range 241 is a circular area centering around the position of the player character 201 and having a radius smaller than that of the reference range 220. The phrase "the stop determination range 241 is a range within the reference range 220" includes a case where a part of the circumference of the stop determination range 241 overlaps a part of the circumference of the reference range 220. In another example, the stop determination range 241 may be a range not including the position of the player character 201. The reference range 220 and the stop determination range 241 may have any specific positions, sizes, and shapes. For example, both the reference range 220 and the stop determination range 241 may be circular areas centering around the position of the player character 201.

In the modification shown in FIG. 17, the game system 1 sets the stop target positions 221 to 225 within the reference range 220 as in the above exemplary embodiment. In this modification, the stop target positions 221 to 225 are located outside the stop determination range 241. In another modification, the stop target positions 221 to 225 may be set to be located within the stop determination range 241.

In the modification, at the time of shifting to the standby mode, the game system 1 sets the stop determination range 241 together with the reference range 220. Then, the game system 1 causes a companion character (in the example shown in FIG. 17, the companion characters 202 and 204) positioned within the stop determination range 241 at the time of shifting to the standby mode, to stop there. That is, as for the companion character positioned within the stop determination range 241 at the time of shifting to the standby mode, the game system 1 stops movement of the companion character regardless of whether or not the companion character is located at the stop target position.

Meanwhile, as for a companion character (in the example shown in FIG. 17, the companion characters 203, 205, and 206) positioned outside the stop determination range 241 at the time of shifting to the standby mode, the game system 1 moves the companion character to the stop target position and stops the companion character there. Therefore, in the modification, a companion character (in the example shown in FIG. 17, the companion character 206) positioned within the reference range 220 and outside the stop determination range 241 at the time of shifting to the standby mode, moves to the stop target position. In the modification, as in the above exemplary embodiment, the stop target positions are located near the circumference of the reference range 220 (see FIG. 17). Therefore, in the example shown in FIG. 17, the companion character 206 positioned within the reference range 220 and outside the stop determination range 241 at the time of shifting to the standby mode, moves in a direction away from the player character 201. In addition, a companion character (in the example shown in FIG. 17, the companion characters 203 and 205) positioned outside the reference range 220 at the time of shifting to the standby mode, moves toward the stop target position, whereby this companion character moves from the position outside the reference range 220 to the position inside the reference range 220 and stops there, also in this modification as in the above exemplary embodiment. Therefore, the companion characters 202 to 206 stop moving within the reference range 220 in the standby mode, also in this modification as in the above exemplary embodiment.

As in the above modification, when the player character has stopped moving, if a companion character is positioned within the stop determination range 241 which is a range within the reference range 220, the game system 1 may stop movement of this companion character regardless of whether or not this companion character is positioned at the stop target position, whereas, if a companion character is positioned outside the stop determination range 241, the game system 1 may move this companion character to the stop target position. Thus, it is possible to increase the situations where the companion character moves to the corresponding stop target position and stop there at the time of shifting to the standby mode. As for a companion character present near the player character 201 (i.e., a companion character within the stop determination range 241) at the time of shifting to the standby mode, the game system 1 stops movement of the companion character there, also in this modification as in the above exemplary embodiment. Therefore, the possibility that the player feels discomfort because the companion character present near the player character 201 continues moving even after the player character 201 has stopped moving, can be reduced, also in this modification as in the above exemplary embodiment.

In the exemplary embodiment, basically, the companion characters 202 to 206 do not move during the standby mode. However, in first to third exceptions as follows, the companion characters may move even during the standby mode. When any of the first to third exceptions as follows occurs, the companion characters move in directions different from the moving direction of the player character, or move in directions not related to the moving direction of the player character. In this regard, it can be said that movements of the companion characters under the first to third exceptions are movements of different kinds from the movements of the companion characters in the accompanying mode.

The first exception is a case where a companion character is in a fightable state. In the exemplary embodiment, each companion character is controlled by the game system 1 to be in one of a non-fighting state and a fightable state, which are states regarding the fight against an enemy character. The companion character in the non-fighting state does not fight, while the companion character in the fightable state can fight (i.e., can perform a motion regarding the fight). When the companion character is in the fightable state, the companion character is controlled to perform a motion regarding an attack to the enemy character (i.e., a motion of moving toward the enemy character as an attack target, or a motion of attacking the enemy character). In the exemplary embodiment, the game system 1 shifts the companion character from the non-fighting state to the fightable state in response to a predetermined fight condition having been satisfied. The fighting condition may have any specific content. For example, the fighting condition is that the companion character itself or the player character has been found by the enemy character, or that the companion character itself has found the enemy character. For example, when the enemy character has been defeated and thereby the fighting condition is not satisfied anymore, the companion character is controlled to return from the fightable state to the non-fighting state.

As for the companion character that has entered the fightable state because of the fighting condition having been satisfied, the game system 1 controls the motion of the companion character, based on a motion algorithm in fighting. Therefore, even in the standby mode, the motion of the companion character in the fightable state is controlled based on the motion algorithm in fighting, which may cause the companion character to move (e.g., approach the enemy character).

When the companion character in the fightable state has returned to the non-fighting state in the standby mode, the game system 1 stops the companion character within the reference range. For example, if the position of the companion character having returned to the non-fighting state is within the reference range, the game system 1 may stop the companion character there, whereas, if the position of the companion character having returned to the non-fighting state is outside the reference range, the game system 1 may move the companion character to the stop target position and stop the companion character there.

The companion character may enter the fightable state not only in the standby mode but also in the accompanying mode. Even in this case, the game system 1 controls movement of the companion character regardless of the target position (the movement target position in the accompanying mode). That is, even while the companion character is moving in the accompanying mode, the game system 1 sets the companion character to the fightable state, and causes the companion character to perform movement regarding the fight, regardless of the movement target position.

As described above, in the exemplary embodiment, when the fighting condition for the companion character to fight against another character has been satisfied, the game system 1 moves the companion character regardless of whether or not the player character is outside the stop range. This allows the companion character to perform a natural motion for fighting even during the standby mode. In other embodiments, the game system 1 may move the companion character toward the target position (i.e., the movement target position or the stop target position) even when the companion character is in the fightable state as in the case where it is in the non-fighting state.

The game system 1 may control movement of the companion character in the fightable state, with or without the target position or the reference range being considered. In the former case, the game system 1 may move the companion character within a predetermined range centering around the target position or within the reference range, for example.

In the exemplary embodiment, the player character itself can attack an enemy character. Specifically, the game system 1 controls the player character to attack another character (e.g., an enemy character) according to an operation input performed by the user. For example, the player character performs a motion of attacking the enemy character with a weapon that the player character is equipped with. The operation input is an input different from an operation input with which the player character makes an instruction to a companion character, and for example, is an input by pressing the Y-button 56 of the right controller 4 with the player character holding the weapon. As described above, according to the exemplary embodiment, the player can cause the player character itself to perform an attack, and also can cause a companion character to perform an attack according to an instruction by the player character. Thus, attack options can be increased, thereby improving strategic characteristics of the game.

The second exception is a case where the action target object is placed near a companion character that is stopped in the standby mode. For example, this case is when an item appears near the companion character, or when a non-player character to which the player character 201 can talk to approaches the companion character. In this case, if the companion character is stopped there, it is difficult for the player to make the player character perform an action to an intended target, i.e., the action target object or the companion character, as in the case described with reference to FIG. 15.

Therefore, when the action target object appears near the companion character stopped in the standby mode, the game system 1 moves the companion character to a position distant from the action target object, and stops the companion character there. The stop position may be determined in the same manner as in the case of determining a stop position for the companion character in the example shown in FIG. 15. In the above case, if the companion character is placed at a position different from the stop target position (because, for example, the companion character is positioned within the reference range at the time of entry to the standby mode) and the stop target position is distant from the action target object, the game system 1 may move the companion character to the stop target position. Thus, even when the action target object appears near the companion character in the standby mode, the player can easily perform an operation of causing the player character to perform an action to the companion character or the action target object.

There is a case where a movement target position is set near an action target object in the accompanying mode. In this case, the game system 1 may change the movement target position to a position distant from the action target object in the same manner as in the case of changing the stop target position in the standby mode (see FIG. 15).

As described above, in the exemplary embodiment, when an operation input has been performed by the player in the state where an action target object is positioned within the action range that is set based on the position of the player character, the game system 1 executes a control corresponding to the action target object (e.g., a control for causing the player character to acquire an item, or a control for causing the player character to talk to a non-player character). Moreover, the game system 1 stops a companion character at a position that is not within an action range based on the position of the player character in the state where the action target object is positioned within the action range (i.e., a position at which the player character cannot make an instruction to the companion character in the state where the player character can perform an action to the action target object). Specifically, in the exemplary embodiment, the game system 1 stops the companion character at a position distant from the action target object in the following three cases: a case where the companion character positioned outside the reference range at the time of entry to the standby mode is stopped in the reference range (see FIG. 15); a case where the companion character positioned within the reference range at the time of entry to the standby mode is stopped within the reference range; and a case where the action target object appears near the companion character after shifting to the standby mode (i.e., the above second exception). Thus, it is possible to make the situation where the player character can perform actions to both the action target object and the companion character, not likely to occur, and therefore, the player can easily perform an operation of causing the player character to perform these actions. In other embodiments, the game system 1 may stop the companion character at the position distant from the action target object, only in any one or two cases out of the above three cases.

In other embodiments, a first action range in which the player character can make an instruction to the companion character and a second action range in which the player character can perform an action to the action target object may be different shapes and/or sizes. Even when these action ranges are different from each other, the game system 1 stops the companion character at a position where the companion character is not within the first action range in the state where the action target object is positioned within the second action range, as in the exemplary embodiment. For example, when the first action range is larger than the second action range, the game system 1 may stop the companion character at a position where the distance between the action target object and the companion character becomes longer than the width of the longest part of the first action range. Thus, as in the exemplary embodiment, it is possible to make the situation where the player character can perform actions to both the action target object and the companion character, not likely to occur.

The third exception is a case where an operation in an aiming mode is performed. In the exemplary embodiment, the game system 1 can generate a game image in a normal mode or an aiming mode as a game image generating mode. The normal mode is a mode in which a game image is generated based on a virtual camera placed at a position behind the player character (see FIG. 8, for example). Meanwhile, the aiming mode is a mode in which a game image is generated based on a virtual camera placed at a position nearer to the player character than that in the normal mode. In the exemplary embodiment, for example, when the player character uses a specific weapon or item, the game image generating mode is set to the aiming mode.

Figure 18:
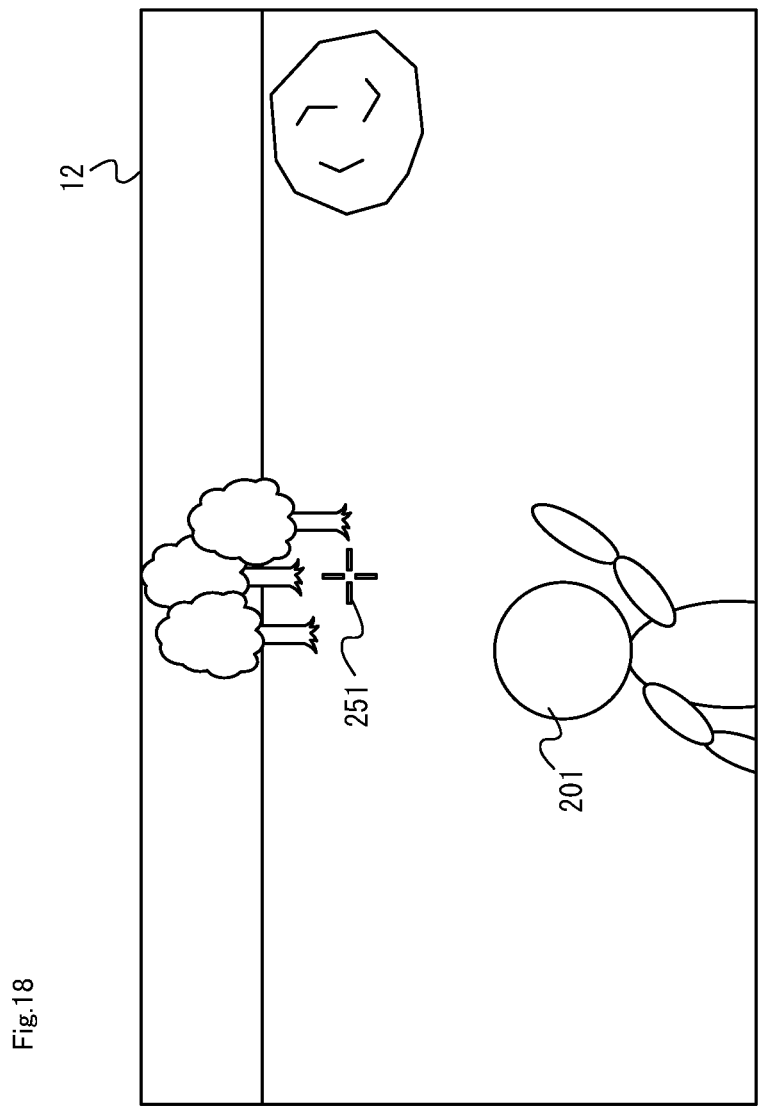
FIG. 18 shows an example of a game image in an aiming mode.

FIG. 18 shows an example of the game image in the aiming mode. In the example shown in FIG. 18, the player character 201 attempts to launch a remote attack. At this time, as shown in FIG. 18, the game image is generated in the aiming mode. In the aiming mode, the game system 1 changes the direction of the virtual camera, according to an operation input by the player designating a direction (e.g., an operation input to the analog stick 52 of the right controller 4). In the exemplary embodiment, the player character 201 launches the remote attack toward an aim mark 251 displayed near the center of the game image. Therefore, the player can change the line-of-sight direction and the remote attack launching direction in the game image by the above operation input.

In the exemplary embodiment, a game image including the player character 201 is generated also in the aiming mode as in the normal mode. However, in other embodiments, a game image not including the player character 201 (i.e., a game image based on a so-called first person viewpoint) may be generated in the aiming mode. Not limited to the case where the player character 201 launches a remote attack, a game image may be generated in the aiming mode also in a case where another item (e.g., an item whose direction in use is designated by the player) is used, or a case where an image taking is virtually performed in a virtual space.

When the game image is generated in the aiming mode as described above in the standby mode, the game system 1 moves a companion character such that the companion character moves out of the field-of-view range of the virtual camera. For example, if the companion character is positioned within the field-of-view range of the virtual camera because of the operation input to change the direction of the virtual camera having been performed, the companion character moves to a position outside the field-of-view range of the virtual camera and stops there. This prevents the companion character from blocking the player's view in the aiming mode, and allows the player to easily perform the operation in the aiming mode. The game system 1 may move a companion character that is likely to enter the field-of-view range of the virtual camera before the companion character is positioned within the field-of-view range, or may move a companion character after the companion character is positioned within the field-of-view range of the virtual camera.

Not only in the standby mode but also in the accompanying mode, the game system 1 may generate a game image in the aiming mode. In this case, the game system 1 may move a companion character such that the companion character moves out of the field-of-view range of the virtual camera, not only in the standby mode but also in the accompanying mode. For example, when a movement target position is within the field-of-view range of the virtual camera, the game system 1 may change the movement target position to a position outside the field-of-view range.

In other embodiments, as control modes for controlling movement of each companion character, the aiming mode, and a fighting mode in which the companion character is in the fighting state may be set. That is, under a certain condition, the game system 1 may control movement of the companion character by shifting from the accompanying mode or the standby mode to the fight mode or the aiming mode. Meanwhile, in the exemplary embodiment, the method for controlling movement of each companion character is changed by changing the control mode. However, in other embodiments, the control mode may not necessarily be set, and the method for controlling movement of each companion character may be changed by any process. That is, without setting the control mode, the game system 1 may perform the movement control for a non-player character as described above when any of conditions, such as the player character moving out of the stop range, the player character stopping, and the non-player character being set in the fighting state, has been satisfied, by a control method corresponding to the satisfied condition.

The above description has been made as to the case where, in the accompanying mode and the standby mode, the target positions (i.e., the movement target positions in the accompanying mode or the stop target positions in the standby mode) are set so as to satisfy the predetermined positional relationship, based on the position and the orientation of the player character. Here, under a specific situation, the game system 1 may set each target position to be changed from the position at which the positional relationship with respect to the player character becomes the predetermined positional relationship. The target position may be set at a different position according to the game situation as described below.

For example, there may be a case where the companion character cannot move to the target position that is set to the position satisfying the predetermined positional relationship. For example, this case is where the position is not on the ground (i.e., in the air), or where the position is on the inner side of a wall. In such a case, the game system 1 sets the target position at an appropriate position (i.e., a position to which the companion character can move). Therefore, for example, if the player character is positioned on a narrow road with cliff edges on the left and right side or a narrow road with walls on the left and right side, the target position may be set at a position on the road. In this case, the game system 1 may set the target position at a position behind the player character so that the player can easily view an area forward of the player character.

Moreover, for example, when the second exception or the third exception has occurred, the game system 1 may change the target position and move the companion character to the changed target position, instead of moving the companion character without changing the target position. For example, when the second exception has occurred, the game system 1 may set the target position at a position distant from the action target object. Meanwhile, when the third exception, such as the player character using a remote attack, has occurred, the game system 1 may change the target position to a position behind the player character, and control the companion character to move to the changed target position.

In the exemplary embodiment, the player can make an instruction for causing each companion character to appear in the game space or withdraw from the game space. Therefore, the number of companion characters appearing in the game space may become four or less in some cases. Therefore, in the accompanying mode and the standby mode, the game system 1 sets target positions according to the number of (i.e., as many as) the appearing companion characters.

In the case of setting four or less target positions, these target positions may be arranged in any way. In the exemplary embodiment, in the accompanying mode, when setting four or less target positions, the game system 1 sets the target positions at positions forward of the player character with respect to the moving direction of the player character as in the case of setting five target positions. In addition, in the standby mode, when setting four or less target positions, the game system 1 sets the stop target positions so as to surround the player character as in the case of setting five target positions (except for the case of setting one stop target position). For example, when setting three target positions, the respective target positions may be set at the same positions as the three stop target positions 211, 213, and 215 surrounding the player character 201, out of the stop target positions 221 to 225 shown in FIG. 14. When setting four or less target positions, the game system 1 may set the respective target positions at positions different from the target positions in the case of setting five target positions.

When the player character is in a specific situation, the game system 1 may temporarily withdraw the companion characters from the game space, regardless of presence/absence of a player's instruction. For example, while the player character is climbing a wall, or gliding or falling in the air, the companion characters may withdraw from the game space. During the period, the game system 1 may or may not set target positions.

[2-3. Processing when Designated Companion Character is Set]

Next, a case where a designated companion character is set from among companion characters will be described. In the exemplary embodiment, the game system 1 may set one of the companion characters as a designated companion character. Although described in detail later, for example, among the companion characters, a companion character to which the last readiness instruction has been made is set as a designated companion character. In the exemplary embodiment, in the accompanying mode and the standby mode, the designated companion character is placed at a position nearer to the player character than normal companion characters (i.e., the companion characters other than the designated companion character). Hereinafter, the designated companion character will be described.

Figure 19:
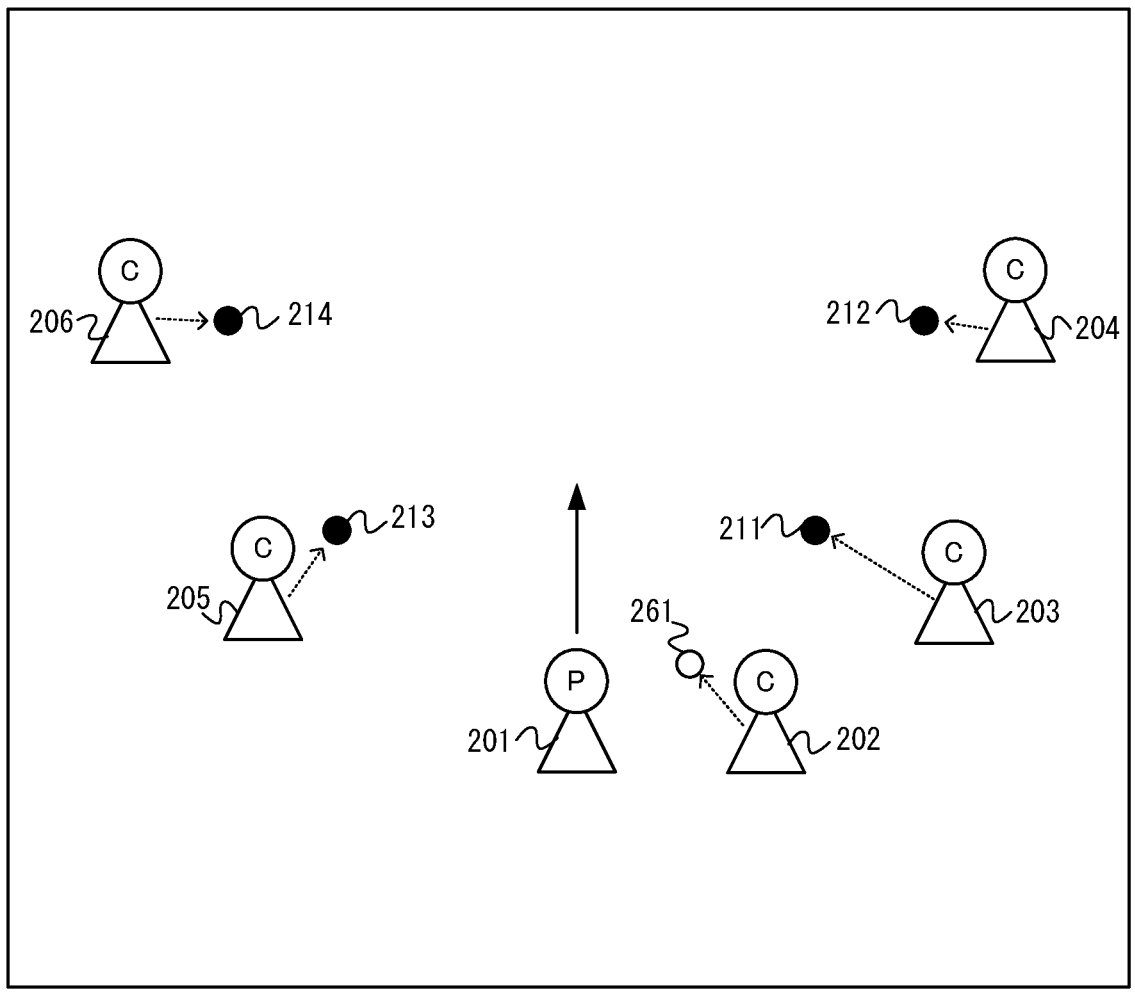
FIG. 19 shows an example of arrangement of the characters when a designated companion character is set in the accompanying mode.

FIG. 19 shows an example of arrangement of the characters in the case where a designated companion character is set in the accompanying mode. In the example shown in FIG. 19, the companion character 202 is set as a designated companion character. With the designated companion character being set in the accompanying mode, the game system 1 sets a designated movement target position 261 which is a movement target position corresponding to the designated companion character, as shown in FIG. 19.

When the designated movement target position 261 is set, the number of normal movement target positions is four (i.e., one character less than the number of appearing companion characters). In the example shown in FIG. 19, the normal movement target positions 211 to 214 are the same as the positions in the case where the designated movement target position 261 is not set (see FIG. 12), but may be different from the positions. Moreover, in the example shown in FIG. 19, the designated movement target position 261 is set instead of the normal movement target position 215, but the designated movement target position 261 may be set instead of any one of the other movement target positions 211 to 214.

As shown in FIG. 19, the designated movement target position 261 is set to be nearest to the player character 201 among the movement target positions 211 to 214 and 261. That is, the game system 1 sets the designated movement target position 261 such that the distance from the player character 201 to the designated movement target position 261 is shorter than each of the distances from the player character 201 to the normal movement target positions 211 to 214. The control method for moving each companion character to the corresponding movement target position is the same in both the case of setting the designated companion character and the case of setting no designated companion character. Thus, the designated companion character 202 is controlled to move toward the designated movement target position 261, and therefore is more likely to be placed at the position nearest to the player character 201 among the companion characters 202 to 206.

Thus, an instruction by the player character 201 is more easily performed to the designated companion character 202 than to the normal companion character 203 to 206. In the game, it is conceivable that there is a situation where, as for a companion character to which the player has instructed execution of a skill motion, the player desires to again make an instruction to this companion character continuously (i.e., without making an instruction to another companion character). According to the exemplary embodiment, since the designated companion character is set, the player can easily make an instruction to a desired companion character (i.e., the companion character set as the designated companion character) under the above situation.

In the accompanying mode, the designated movement target position 261 is set forward of the player character 201, like the other movement target position 211 to 214 (see FIG. 19). Therefore, in the case of setting the designated companion character, as in the case of not setting the same, the game image including the companion characters 202 to 206 (see FIG. 11) is more likely to be generated, and the player can easily grasp the positions of the companion characters 202 to 206 in the accompanying mode.

As described above, in the accompanying mode, in response to movement of the player character toward at least one companion character among a plurality of companion characters, the game system 1 makes the moving speed of the companion character lower than the moving speed of the player character (see FIG. 13). Therefore, when the player character moves toward the designated companion character, the game system 1 makes the moving speed of the designated companion character lower than the moving speed of the player character, as in the case of the normal companion character. For example, the moving speed of the designated companion character may be changed to a speed lower than the upper-limit value of the moving speed of the player character, may be changed to a speed lower than the current moving speed of the player character, or may be changed to 0. Thus, the player character is more likely to approach the designated companion character, and can easily make an instruction to the designated companion character.

Figure 20:
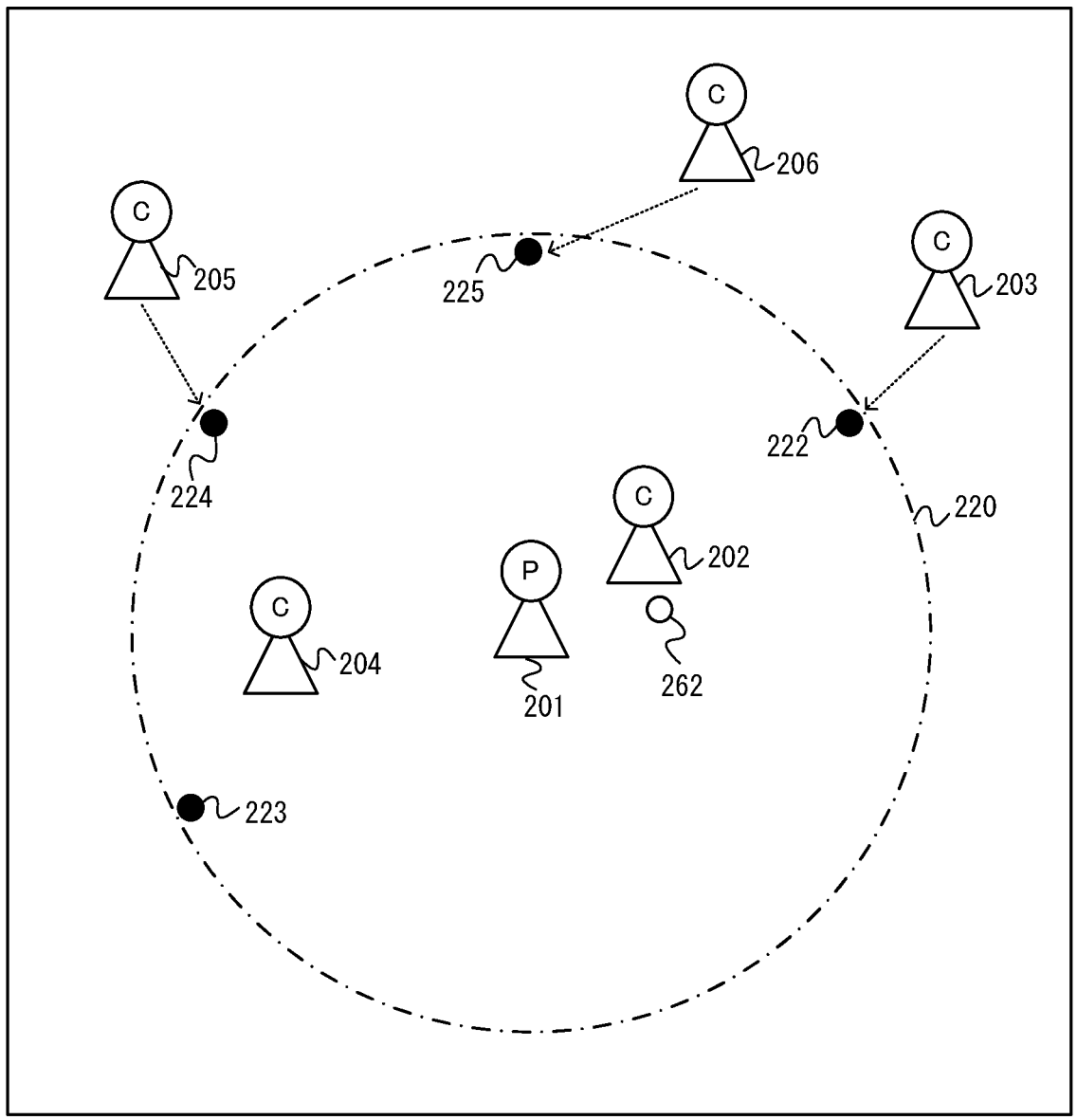
FIG. 20 shows an example of arrangement of the characters when a designated companion character is set in the standby mode.

FIG. 20 shows an example of arrangement of the characters in the case where a designated companion character is set in the standby mode. In the example shown in FIG. 20, the companion character 202 is set as a designated companion character. With the designated companion character being set in the standby mode, the game system 1 sets a designated stop target position 262 which is a stop target position corresponding to the designated companion character, as shown in FIG. 20.

When the designated stop target position 262 is set, the number of normal stop target positions is four (i.e., one character less than the number of appearing companion characters). In the example shown in FIG. 20, the normal stop target positions 222 to 225 are the same as the positions in the case where the designated stop target position 262 is not set (see FIG. 14), but may be different from the positions. Moreover, in the example shown in FIG. 20, the designated stop target position 262 is set instead of the normal stop target position 221, but the designated stop target position 262 may be set instead of any one of the other stop target positions 222 to 225.

As shown in FIG. 20, the designated stop target position 262 is set to be nearest to the player character 201 among the stop target positions 221 to 224 and 262. That is, the game system 1 sets the designated stop target position 262 such that the distance from the player character 201 to the designated stop target position 262 is shorter than each of the distances from the player character 201 to the normal stop target positions 222 to 225. The control method for moving each companion character to the corresponding target position in the standby mode is the same in both the case of setting the designated companion character and the case of setting no designated companion character. That is, the game system 1 causes a companion character, whose position at the time of shifting to the standby mode is within the reference range 220, to stop there, and causes a companion character, whose position at the time of shifting to the standby mode is outside the reference range 220, to move to the stop target position and stop there.

As described above, since the designated companion character 202 is likely to be placed near the player character 201 in the accompanying mode, if the designated companion character 202 is positioned within the reference range 220 at the time of shifting from the accompanying mode to the standby mode, the designated companion character 202 is placed near the player character 201 as it is. Even if the designated companion character 202 is positioned outside the reference range 220 at the time of shifting from the accompanying mode to the standby mode, since the designated companion character 202 moves to the designated stop target position 262 near the player character 201 and stops there, the designated companion character 202 is placed near the player character 201. Therefore, even in the standby mode, the designated companion character 202 is more likely to be placed at the position nearest to the player character 201 among the companion characters 202 to 206.

As described above, in the exemplary embodiment, while the plurality of companion characters are moving (i.e., being in the accompanying mode) according to movement of the player character, the game system 1 controls movements of the plurality of companion characters so as to satisfy the positional relationship in which the distance between the player character and the designated companion character is shorter than each of the distances between the player character and the normal companion characters (see FIG. 19). Moreover, the game system 1 stops movements of the plurality of companion characters according to stop of movement of the player character such that the distance between the player character and the designated companion character is shorter than each of the distances between the player character and the normal companion characters. Specifically, the game system 1 sets the stop target positions for the plurality of companion characters such that the distance between the player character and the stop target position of the designated companion character is shorter than each of the distances between the player character and the stop target positions of the normal companion characters. Thus, the designated companion character is more likely to be located at a position near the player character in both the case where the plurality of companion characters are moving and the case where they are stopped. Moreover, use of the stop target positions allows movement control for the companion characters to be stopped, to be easily performed. In other embodiments, the game system 1 may control movements of the plurality of companion characters so as to satisfy the positional relationship in which the distance between the player character and the designated companion character is shorter than each of the distances between the player character and the normal companion characters, only in one of the accompanying mode and the standby mode.

The process of shifting the control mode from the standby mode to the accompanying mode in the case of setting the designated companion character is the same as that in the case of setting no designated companion character. That is, in the case where the player character resumes moving after having been stopped, the game system 1 does not allow the companion character to resume movement according to movement of the player character (i.e., movement to be controlled in the accompanying mode) while the player character is moving within the stop range, and allows the companion character to resume movement according to movement of the player character when the player character has moved out of the stop range.

In other embodiments, a stop range different from the stop range used for the normal companion characters may be used for the designated companion character. That is, the game system 1 may use a first stop range as the stop range for the designated companion character, and a second stop range as the stop range for the normal companion characters, and may set the first stop range to be narrower than the second stop range. Specifically, the second stop range may be a range that is an inner side of at least one of the reference range and an additional range based on the position of each normal companion character, and the first stop range may be a range that is an inner side of at least one of a circular range having a radius smaller than that of the reference range, and an additional range based on the position of the designated companion character. Thus, the game system 1 can start movement control in the accompanying mode at an earlier timing for the designated companion character than for the normal companion character. Therefore, the designated companion character starts moving along with the player character at an earlier timing than the normal companion character, whereby the designated companion character is more likely to be placed at a position near the player character.

In the case where any of the first to third exceptions described above occurs, the process of moving the companion characters regardless of the target positions is the same in both the case of setting the designated companion character and the case of setting no designated companion character. In other embodiments, in the case where the designated companion character is in the fightable state, the game system 1 may control the designated companion character to move to a position near the player character. That is, while a plurality of companion characters are moving because of the fighting condition being satisfied, the game system 1 may control movements of these companion characters so as to satisfy the positional relationship in which the distance between the player character and the designated companion character is shorter than each of the distances between the player character and the normal companion characters. Specifically, the game system 1 may perform, for the normal companion characters, movement control for the fight regardless of the target positions, whereas the game system 1 may perform, for the designated companion character, movement control for the fight such that the designated companion character moves within the reference range or a predetermined range centering around the designated stop target position or the designated movement target position. Thus, even while the designated companion character is fighting, the designated companion character is more likely to be placed at a position near the player character.

Next, a method for setting a designated companion character will be described. In the exemplary embodiment, the game system 1 sets, as a designated companion character, a companion character to which the last readiness instruction has been made among the companion characters, except for a specific game scene described later. Therefore, for example, when a readiness instruction has been made to a normal companion character in the state where a designated companion character is set, the designated companion character is replaced with the normal companion character. That is, when a predetermined control corresponding to the normal companion character (i.e., a control for setting the companion character in the readiness state) has been performed, the game system 1 changes the designated companion character having been set, to the normal companion character, and sets the normal companion character subjected to the predetermined control, to a new designated companion character. If there are too many designated companion characters, many companion characters are placed near the player character, and a plurality of companion characters are likely to be included in the action range based on the player character. This situation may result in a possibility that it is actually difficult for the player to make an instruction to an intended companion character. Meanwhile, according to the exemplary embodiment, since the designated companion character can be replaced, the excessive increase in designated companion characters can be inhibited, thereby reducing the above possibility. Moreover, in the exemplary embodiment, since replacement of the designated companion character can be performed by the readiness instruction, the player may not necessarily perform an additional operation for replacement, and can easily perform the operation. In other embodiments, when a readiness instruction is made to a normal companion character in the state where a designated companion character is set, the game system 1 may simply add a designated companion character without replacing the designated companion character as described above.

In the exemplary embodiment, the number of designated companion characters to be simultaneously set is one. However, in other embodiments, a plurality of companion characters may be simultaneously set as designated companion characters. However, an upper-limit number of designated companion characters is less than the number of accompanying companion characters. If the number of designated companion characters being set already reaches the upper-limit number, the game system 1 changes one of the designated companion characters having been set, to a normal companion character, when a control for setting the normal companion character in the readiness state has been executed, and sets the normal companion character on which the control has been executed, to a new designated companion character. If a plurality of designated companion characters are set, the phrase "changing a designated companion character having been set, to a normal companion character" includes a case of changing one of the designated companion characters to a normal companion character.

When the designated companion character has been replaced as described above, the game system 1 changes the correspondence relationship between the companion characters and the target positions. That is, the companion character newly set as a designated companion character is associated with a designated movement target position or a designated stop target position, and the companion character returned to a normal companion character is associated with a normal movement target position or a normal stop target position. Thus, the new designated companion character is more likely to be placed near the player character.

As described above, in the exemplary embodiment, when a readiness instruction has been made to a companion character, the game system 1 sets this companion character to a designated companion character. In the exemplary embodiment, a first control to be executed according to a readiness instruction is a control for shifting the companion character to a readiness state of a second control that causes the companion character to have an influence on another object. In the readiness state of the second control, the game system 1 executes the second control according to an operation input (i.e., an operation input for making an execution instruction) performed by the user. The second control may be any control that causes a companion character to have an influence on another object. For example, the second control may be a control that causes the companion character to perform a skill motion of attacking an enemy character, or a control that causes the companion character to perform a motion of destroying an object (e.g., a rock) placed in the game space, in the exemplary embodiment. Thus, according to the exemplary embodiment, the player can set the designated companion character by the readiness instruction, without causing the companion character to perform the second control that may have an influence on another character. In the exemplary embodiment, once the second control that causes a companion character to perform the skill motion is executed, the companion character is restricted in performing the skill motion again until the standby time described above elapses. However, by setting the designated companion character through the readiness instruction as described above, the designated companion character can be set without being restricted in performing the skill motion.

In the exemplary embodiment, in a specific game scene, a companion character according to the scene is set as a designated companion character, regardless of which companion character has been subjected to the last readiness instruction. That is, in the specific game scene, the game system 1 sets, as a designated companion character, a companion character associated with the specific game scene among a plurality of companion characters. This allows an instruction to a specific companion character to be easily made in the specific game scene. For example, in the specific game scene, the game may be designed such that the skill motion by the companion character associated with the game scene is effective for the game progress. Specifically, the game may be designed such that many enemy characters, which are weak against an attack due to the skill motion of the companion character, appear, or the terrain is configured to allow the companion character to go ahead by using the skill motion. In this case, the companion character suitable for the game scene being set as a designated companion character allows the player to easily progress the game.

The specific game scene may be, for example, a specific period in a game scenario, a scene in which the player character is present in a specific area, or a scene in which the player character fights against a specific enemy character. Moreover, the game system 1 may associate a plurality of game scenes with different companion characters, respectively. This allows the game system 1 to change the designated companion character for each of the plurality of game scenes.

In the case where the companion character associated with the specific game scene is set as a designated companion character in the specific game scene, even when the player character has made a readiness instruction to a normal companion character, this normal companion character is not set as a designated companion character (i.e., the designated companion character is not changed). However, in other embodiments, when the player character has made a readiness instruction to a normal companion character in the above case, the normal companion character may be set as a designated companion character. Moreover, in the case where a companion character other than the companion character associated with the specific game scene is set as a designated companion character in the specific game scene, when the designated companion character has withdrawn from the game space, the game system 1 may set the companion character associated with the specific game scene, as a designated companion character.

In other embodiments, the specific game scene may not necessarily be set, and the process of setting as a designated companion character a companion character according to a specific game scene may not necessarily be executed. In other embodiments, the game system 1 may execute the process of setting as a designated companion character a companion character according to a specific game scene, and may not execute the process of setting as a designated companion character a companion character to which the last readiness instruction has been made among the companion characters. Furthermore, in other embodiments, the game system 1 may not execute the process of setting a designated companion character.

In the exemplary embodiment, when a predetermined cancellation condition has been satisfied, the game system 1 cancels setting of the designated companion character. The cancellation condition may have any specific content. In the exemplary embodiment, when a designated companion character has withdrawn from the game space according to player's instruction, setting of the designated companion character is canceled. Therefore, the player can easily cancel setting of a designated companion character by causing the designated companion character to withdraw from the game space. Moreover, setting of the designated companion character may also be canceled when the game is resumed by using save data after having been intermitted, or when the player character is moved by a space warp to a warp point that is set in the game space during the game, for example, in addition to the above case.

3. Specific Example of Processing in Game System

A specific example of information processing in the game system 1 will be described with reference to FIG. 21 to FIG. 26.

Figure 21:
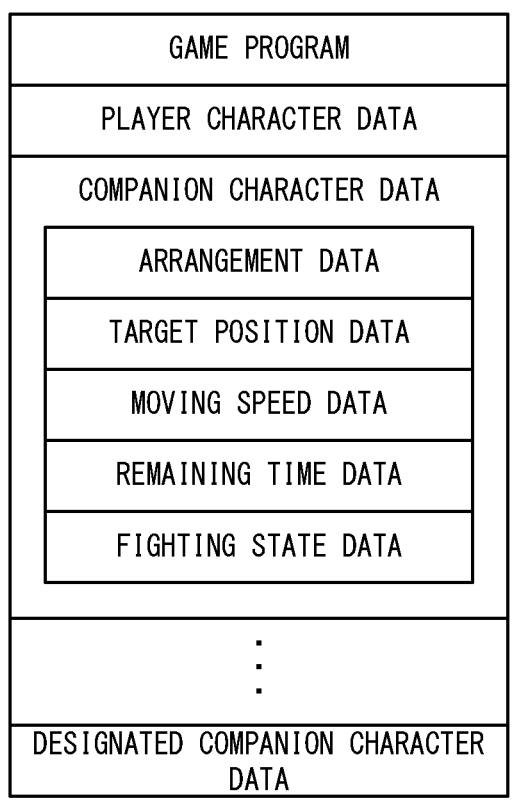
FIG. 21 shows an example of various data used for information processing in a non-limiting game system.

FIG. 21 shows an example of various data used for the information processing in the game system 1. The various data shown in FIG. 21 are stored in a storage medium (e.g., the flash memory 84, the DRAM 85, and/or the memory card attached to the slot 23) accessible by the main body apparatus 2.

As shown in FIG. 21, the game system 1 has a game program stored therein. The game program is a game program for executing game processing (specifically, processes shown in FIG. 22 to FIG. 26) in the exemplary embodiment. The game system 1 has, stored therein, player character data, companion character data, and designated companion character data.

The player character data is data regarding the player character. For example, the player character data includes: data indicating the position and the orientation of the player character in the game space; the state of the player character (hit points, etc.); and data indicating items possessed by the player character.

The companion character data is data regarding a companion character. The companion character data is stored for each of companion characters. In the exemplary embodiment, the companion character data includes placement data, arrangement data, target position data, moving speed data, remaining time data, and fighting state data. The arrangement data indicates the position and the orientation of the companion character in the game space. The target position data indicates a target position corresponding to the companion character, among target positions set by the game system 1. The moving speed data indicates the moving speed of the companion character. The remaining time data indicates a remaining time until the standby time described above elapses, when the companion character performs a skill motion (i.e., until the skill motion is allowed again). The fighting state data indicates the state, regarding the fight, of the companion character (i.e., whether the companion character is in the non-fighting state or in the fightable state).

The designated companion character data indicates a designated companion character being set. If a designated companion character is not set, designated companion character data is not stored.

Figure 22:
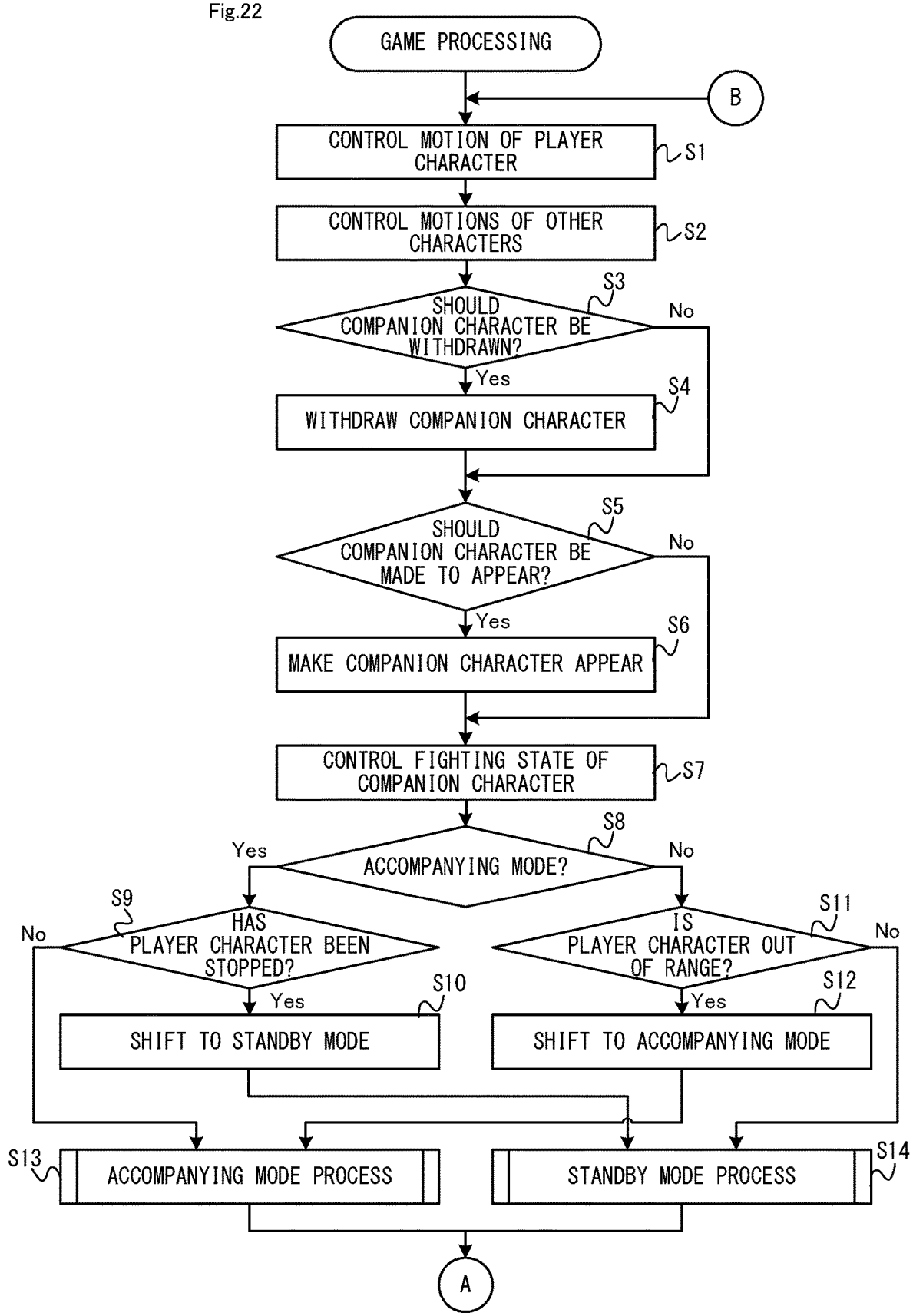
FIG. 22 is a flowchart showing an example of a flow of game processing executed by the non-limiting game system.
Figure 23:
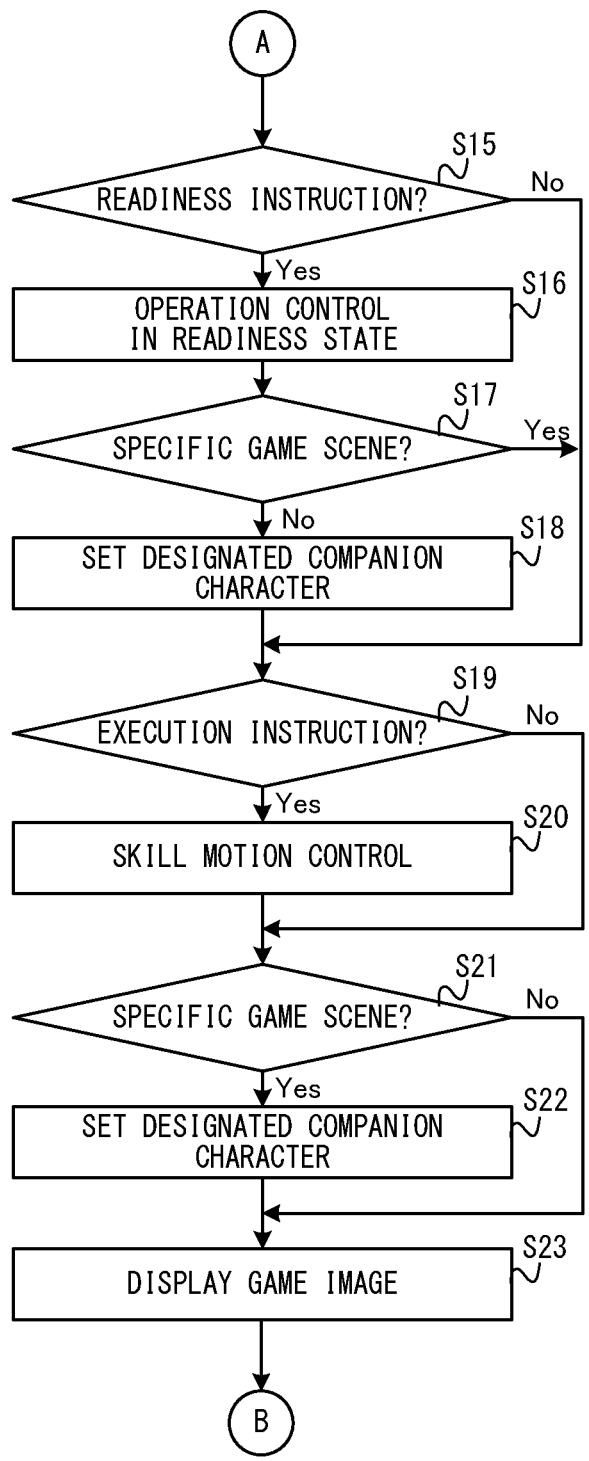
FIG. 23 is a flowchart showing an example of a flow of game processing executed by the non-limiting game system.

FIG. 22 and FIG. 23 are flowcharts showing an example of a flow of game processing executed by the game system 1. The game processing shown in FIG. 22 is started when an instruction to start the game has been made by the player during execution of the game program. At the start of the game, the companion characters may appear in the game space, or may be withdrawn from the game space.

In the exemplary embodiment, the processor 81 of the main body apparatus 2 executes the game program stored in the game system 1 to execute the processes in steps shown in FIG. 22 to FIG. 26. However, in other embodiments, a part of the processes in the steps may be executed by a processor (e.g., a dedicated circuit, etc.) other than the processor 81. Furthermore, if the game system 1 is communicable with another information processing apparatus (e.g., a server), a part of the processes in the steps shown in FIG. 22 to FIG. 26 may be executed by the another information processing apparatus. The processes in the steps shown in FIG. 22 to FIG. 26 are merely examples, and the processing order of the steps may be changed or another process may be executed in addition to (or instead of) the processes in the steps as long as similar results can be obtained.

The processor 81 executes the processes in the steps shown in FIG. 22 to FIG. 26 by using a memory (e.g., the DRAM 85). That is, the processor 81 stores information (in other words, data) obtained in each process step into the memory, and reads out the information from the memory when using the information for the subsequent process steps.

In step S1 shown in FIG. 22, the processor 81 controls the motion of the player character, based on an operation input performed by the player. That is, the processor 81 acquires, at an appropriate timing, operation data received from the controllers via the controller communication section 83 and/or the terminals 17 and 21, and controls the motion of the player character, based on the acquired operation data. Thus, the player character moves in the game space, performs an attack motion, and performs an action to an action target object described above. Next to step S1, the process in step S2 is executed.

In step S2, the processor 81 controls the motions of characters (e.g., enemy character) other than the player character and the companion character. That is, the processor 81 controls the motions of the other characters according to the algorithm defined in the game program. Next to step S2, the process in step S3 is executed.

In step S3, the processor 81 determines whether or not to withdraw a companion character appearing in the game space from the game space. Specifically, when an instruction to withdraw the companion character from the game space has been made by the player, or when a condition for temporarily withdrawing the companion character from the game space has been satisfied, the processor 81 determines to withdraw the companion character from the game space. Meanwhile, when such an instruction is not made by the player and the condition is not satisfied, the processor 81 determines not to withdraw the companion character from the game space. The specific method for the player to make the instruction to withdraw the companion character from the game space, is optional. For example, the processor 81 may receive an operation input for an instruction that designates the companion character to be withdrawn from the game space, on a menu screen displayed according to a predetermined operation input performed by the player. The condition is that the companion character is a predetermined distance or more distant from the player character, or that the player character is in the specific situation described above (specifically, climbing a wall or gliding in the air). When the determination result in step S3 is positive, the process in step S4 is executed. When the determination result in step S3 is negative, the process in step S4 is skipped and the process in step S5 is executed.

In step S4, the processor 81 withdraws the companion character from the game space. That is, the processor 81 withdraws, from the game space, the companion character designated by the player or the companion character satisfying the condition. At this time, the processor 81 updates the arrangement data included in the companion character data regarding the withdrawn companion character and stored in the memory, such that the arrangement data indicates that the companion character is not placed in the game space. Furthermore, when withdrawal of the companion character is due to the instruction by the player and the companion character is a designated companion character, the processor 81 cancels setting of the designated companion character. That is, in this case, the processor 81 deletes the designated companion character data stored in the memory. Next to step S4, the process in step S5 is executed.

In step S5, the processor 81 determines whether or not to cause a companion character to appear in the game space. Specifically, when an instruction to cause the companion character to appear in the game space has been made by the player, or when a condition for causing a companion character, having been temporarily withdrawn, to appear again in the game space has been satisfied, the processor 81 determines to cause the companion character to appear in the game space. Meanwhile, when such an instruction is not made by the player and the condition is not satisfied, the processor 81 determines not to cause the companion character to appear in the game space. The specific method for the player to make the instruction that causes the companion character to appear in the game space is optional. For example, the processor 81 may receive an operation input for an instruction that designates the companion character to appear in the game space, on the menu screen described above. The condition is that the companion character is temporarily withdrawn from the game space because the companion character is a predetermined distance or more distant from the player character, or that, while the companion character is temporarily withdrawn from the game space because the player character has entered the specific situation described above (specifically, climbing a wall or gliding in the air), the specific situation is canceled. When the determination result in step S5 is positive, the process in step S6 is executed. When the determination result in step S5 is negative, the process in step S6 is skipped and the process in step S7 is executed.

In step S6, the processor 81 causes the companion character to appear in the game space. That is, the processor 81 causes the companion character designated by the player or the companion character satisfying the above condition to appear at a predetermined position around the player character. At this time, the processor 81 updates the companion character data, stored in the memory, regarding the appearing companion character such that the data indicates the position and the orientation of the companion character in the game space. When the first companion character appears in step S6 (i.e., the state where no companion character appears is changed to the state where the companion character appears), the control mode for controlling movement of this companion character may be set to a predetermined default mode out of the accompanying mode and the standby mode, or may be set to the mode having been selected in the state where the companion character appeared last time. When the second and subsequent companion characters appear in step S6, the currently set control mode (i.e., the accompanying mode or the standby mode) is maintained. That is, the newly appearing second and subsequent companion characters are controlled in the same control mode as the companion character having already appeared. Next to step S6, the process in step S7 is executed.

In step S7, the processor 81 controls the state, regarding the fight, of each companion character. That is, the processor 81 determines whether or not the fighting condition has been satisfied for each of the companion characters appearing in the game space, based on the result of controlling the motions of the respective characters in steps S1 and S2. Then, the processor 81 sets a companion character satisfying the fighting condition to the fightable state, and sets a companion character not satisfying the fighting condition to the non-fighting state. At this time, the processor 81 updates the fighting state data, stored in the memory, of each companion character such that the data indicates the set content. Next to step S7, the process in step S8 is executed.

In step S8, the processor 81 determines whether or not the control mode for moving the companion character is the accompanying mode described above. When the determination result in step S8 is positive, the process in step S9 is executed. When the determination result in step S8 is negative (i.e., when the control mode is the standby mode), the process in step S11 described later is executed.

In step S9, based on the processing result in step S1, the processor 81 determines whether or not movement of the player character has been stopped. When the determination result in step S9 is positive, the process in step S10 is executed. When the determination result in step S9 is negative, the process in step S13 described later is executed.

In step S10, the processor 81 shifts the control mode for moving the companion character to the standby mode. Next to step S10, the process in step S14 described later is executed.

In step S11, based on the processing result in step S1, the processor 81 determines whether or not the player character has moved out of the stop range. When the determination result in step S11 is positive, the process in step S12 is executed. When the determination result in step S11 is negative, the process of step S13 described later is executed.

In step S12, the processor 81 shifts the control mode for moving the companion character to the accompanying mode. Next to step S12, the process in step S13 is executed.

In step S13, the processor 81 executes an accompanying mode process for controlling movement of each companion character in the accompanying mode. Although described in detail later, in the accompanying mode process, the processor 81 moves each companion character such that the companion character accompanies the player character according to movement of the player character (see FIG. 24). Next to step S13, the process in step S15 (see FIG. 23) is executed.

In step S14, the processor 81 executes a standby mode process for controlling movement of each companion character in the standby mode. Although described in detail later, in the standby mode process, the processor 81 stops movement of each companion character within the reference range based on the player character, according to stop of movement of the player character (see FIG. 26). Next to step S14, the process in step S15 (see FIG. 23) is executed.

In step S15 shown in FIG. 23, based on the operation data described above, the processor 81 determines whether or not an operation input for performing a readiness instruction has been made by the player in the state where the companion character is positioned within the action range of the player character. When the determination result in step S15 is positive, the process in step S16 is executed. When the determination result in step S15 is negative, the processes in steps S16 to S18 are skipped, and the process in step S19 described later is executed.

In step S16, the processor 81 causes the companion character, to which the readiness instruction by the player character has been made, to perform a motion to enter the readiness state described above (e.g., motion of going behind the player character, shown in FIG. 9). At this time, the processor 81 updates the companion character data stored in the memory such that the data indicates the content after the motion. Next to step S16, the process in step S17 is executed.

In step S17, the processor 81 determines whether or not the current game scene is the specific game scene described above in which a specific companion character is set as a designated companion character. When the determination result in step S17 is negative, the process in step S18 is executed. When the determination result in step S17 is positive, the process in step S18 is skipped, and the process in step S19 described later is executed.

In step S18, the processor 81 sets the companion character to which the readiness instruction has been made, to a designated companion character. That is, the processor 81 updates the designated companion character data stored in the memory such that the data indicates the companion character to which the readiness instruction has been made. Next to step S18, the process in step S19 is executed.

In step S19, based on the operation data, the processor 81 determines whether or not an operation input for making an execution instruction to the companion character in the readiness state has been performed by the player in the state where the companion character is able to execute a skill-motion. The "state where the companion character is able to execute a skill motion" is the state after the standby time described above has elapsed from when the companion character executed the skill motion last time (i.e., the time indicated by the remaining time data stored in the memory has become 0). When the determination result in step S19 is positive, the process in step S20 is executed. When the determination result in step S19 is negative, the process in step S20 is skipped, and the process in step S21 is executed.

In step S20, the processor 81 causes the companion character, to which the execution instruction by the player character has been made, to perform the skill motion described above (e.g., motion of making a wind, shown in FIG. 10). At this time, the processor 81 updates the companion character data stored in the memory such that the data indicates the content after the motion. In addition, the processor 81 updates the remaining time data included in the companion character data stored in the memory such that the remaining time data indicates the length of the standby time described above. Thereafter, the processor 81 sequentially updates the remaining time data such that the time indicated by the remaining time data is decreased with the lapse of time. Next to step S20, the process in step S21 is executed.

In step S21, based on the result of controlling the motions of the respective characters in steps S1 and S2, the processor 81 determines whether or not the game is in the specific game scene described above (e.g., the scene in which the player character is positioned in a specific area, or a scene in which the player character fights against a specific enemy character). When the determination result in step S21 is positive, the process in step S22 is executed. When the determination result in step S21 is negative, the process in step S22 is skipped, and the process in step S23 is executed.

In step S22, the processor 81 sets the companion character associated with the current game scene (i.e., the game scene having been determined to be positive in step S21), to a designated companion character. That is, the processor 81 updates the designated companion character data stored in the memory such that the data indicates the companion character. Next to step S22, the process in step S23 is executed. While the above game scene continues, the designated companion character is not changed even if a readiness instruction is made (see steps S17, S18), thereby maintaining the state where the companion character associated with the game scene is the designated companion character.

In step S23, the processor 81 generates a game image representing a game space, and causes the display device to display the game image. For example, the processor 81 generates a game image representing a game space including the player character, based on the position and the direction of the virtual camera controlled according to an operation input performed by the player. At this time, if a companion character is included in the game image, an image of the companion character is generated based on the companion character data in which the processing result in step S13 or S14 is reflected. If a readiness instruction to the companion character is possible, the processor 81 displays the readiness instruction image described above, together with the image of the game space (see FIG. 8). If an execution instruction to the companion character is possible, the processor 81 displays the execution instruction image described above, together with the image of the game space (see FIG. 9). Furthermore, as described above, the processor 81 generates the game image in the aiming mode, depending on the game situation. During the game, a process loop of steps S1 to S23 is repeatedly executed once every predetermined time (e.g., 1 frame time), whereby the game image is updated so as to dynamically reflect the state of the game space. The display device on which the game image is displayed may be the display 12 described above, or may be another display device connected to the main body apparatus 2.

Next to step S23, the process in step S1 is executed again. Thereafter, during the game, the process loop of steps S1 to S23 is repeatedly executed. The game processing shown in FIG. 22 and FIG. 23 is ended when the game is ended. During the game, the game processing may be interrupted under a predetermined situation (e.g., when a moving image for representation of the game is reproduced).

Figure 24:
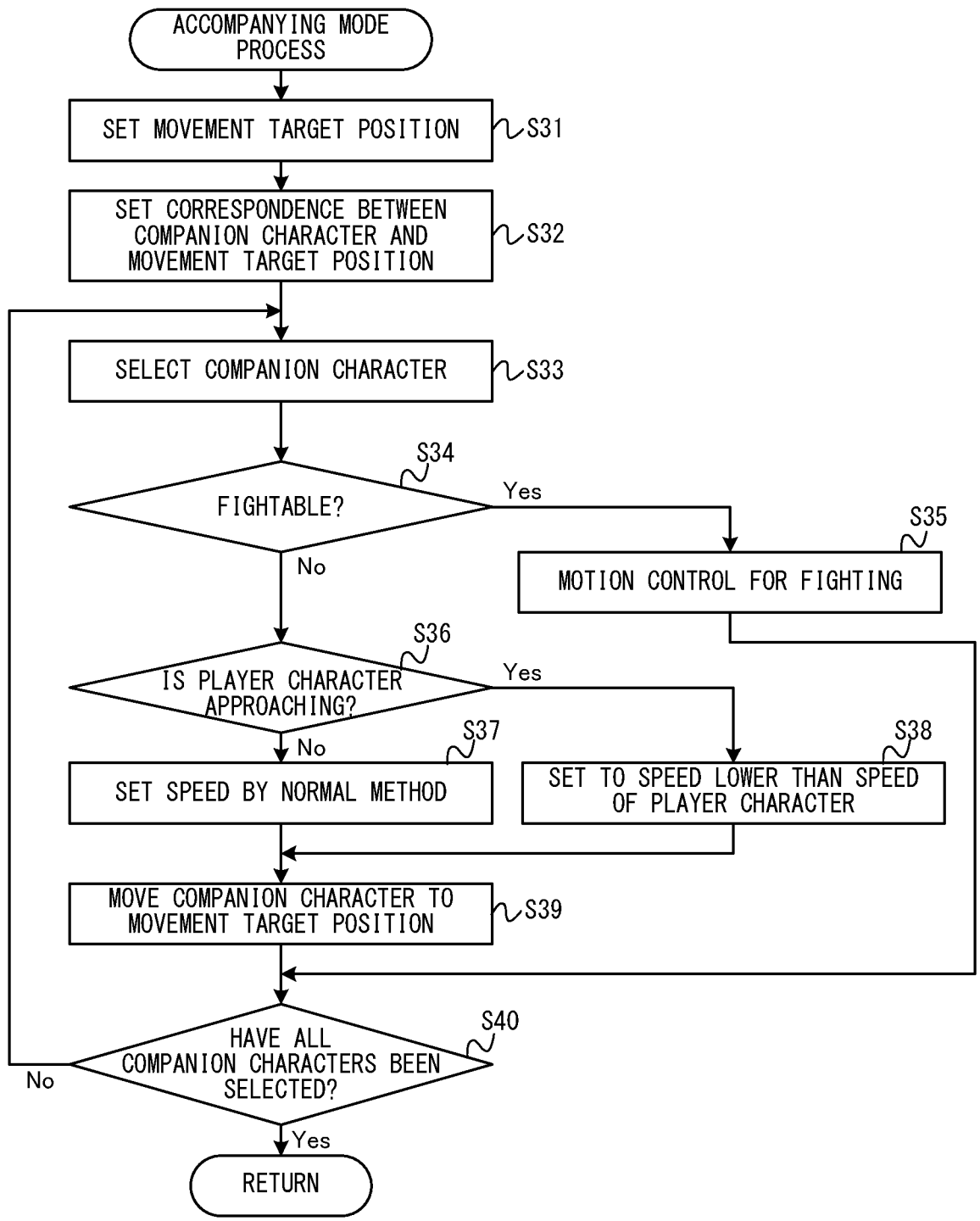
FIG. 24 is a sub flowchart showing an example of a specific flow of an accompanying mode process shown in step S13 in FIG. 22.

FIG. 24 is a sub flowchart showing an example of a specific flow of the accompanying mode process in step S13 shown in FIG. 22. In the accompanying mode process, first, in step S31, the processor 81 sets the movement target positions described above. Specifically, the processor 81 sets movement target positions as many as the companion characters appearing in the game space, according to the method described in the above "[2-2. Process of controlling movement of companion character]". When a designated companion character is set, one of one or more movement target positions being set is a designated movement target position. Next to step S31, the process in step S32 is executed.

In step S32, the processor 81 sets a correspondence relationship between the movement target positions set in step S31 and the companion characters. This correspondence relationship is set according to the method described in the above "[2-2. Process of controlling movement of companion character]". When a designated companion character is set, the correspondence relationship is set such that the designated companion character corresponds to a designated movement target position. The processor 81 updates the target position data included in the companion character data stored in the memory such that the target position data indicates the set correspondence relationship. Next to step S32, the process in step S33 is executed.

In step S33, the processor 81 selects one character from among the companion characters appearing in the game space. At this time, the processor 81 selects a companion character that has not yet been selected in a process loop of steps S33 to S40 in the current accompanying mode. Next to step S33, the process in step S34 is executed.

In step S34, the processor 81 determines whether or not the companion character selected in step S33 is in the fightable state. This determination is performed based on the fighting state data, stored in the memory, regarding the companion character. When the determination result in step S34 is positive, the process in step S35 is executed. When the determination result in step S34 is negative, the process in step S36 is executed.

In step S35, the processor 81 controls the companion character selected in step S33 to perform a motion for fighting. That is, the processor 81 causes the companion character to perform an attack motion to another character being an attack target, or a motion of moving toward the another character being the attack target, based on the motion algorithm in fighting defined in the game program. At this time, the processor 81 updates the companion character data stored in the memory such that the data indicates the content after the motion. Next to step S35, the process in step S40 described later is executed.

In step S36, the processor 81 determines whether or not the player character is moving toward the companion character selected in step S33, based on the result of controlling the motion of the player character in the process in step S1. When the determination result in step S36 is negative, the process in step S37 is executed. When the determination result in step S36 is positive, the process in step S38 is executed.

In step S37, the processor 81 sets the moving speed of the companion character selected in step S33, by an ordinary method. That is, if the companion character can reach the corresponding movement target position at a speed equal to or lower than an upper-limit speed, the moving speed of the companion character is set to this speed, whereas, if the companion character cannot reach the movement target position, the moving speed is set to the upper-limit speed. At this time, the processor 81 updates the moving speed data included in the companion character data stored in the memory such that the moving speed data indicates the set speed.

Meanwhile, in step S38, the processor 81 sets the moving speed of the companion character selected in step S33 to a speed lower than the moving speed of the player character. At this time, the processor 81 updates the moving speed data included in the companion character data stored in the memory such that the moving speed data indicates the set speed. Next to step S38, the process in step S39 is executed.

In step S39, the processor 81 moves the companion character selected in step S33 toward the movement target position set in step S32. At this time, the processor 81 moves the companion character at the moving speed set in step S37 or S38. That is, the processor 81 moves the companion character at the moving speed indicated by the moving speed data, toward the position indicated by the target position data stored in the memory with respect to the companion character. Furthermore, the processor 81 updates the companion character data stored in the memory such that the data indicates the position and the orientation after the movement. Next to step S39, the process in step S40 is executed.

In step S40, the processor 81 determines whether or not all the companion characters appearing in the game space have been selected in step S33 (i.e., all the companion characters have been subjected to movement control). When the determination result in step S40 is negative, the process in step S33 is again executed. Thereafter, the process loop of steps S33 to S40 is repeatedly executed until all the companion characters are selected in step S33. When the determination result in step S40 is positive, the processor 81 ends the accompanying mode process.

Figure 25:
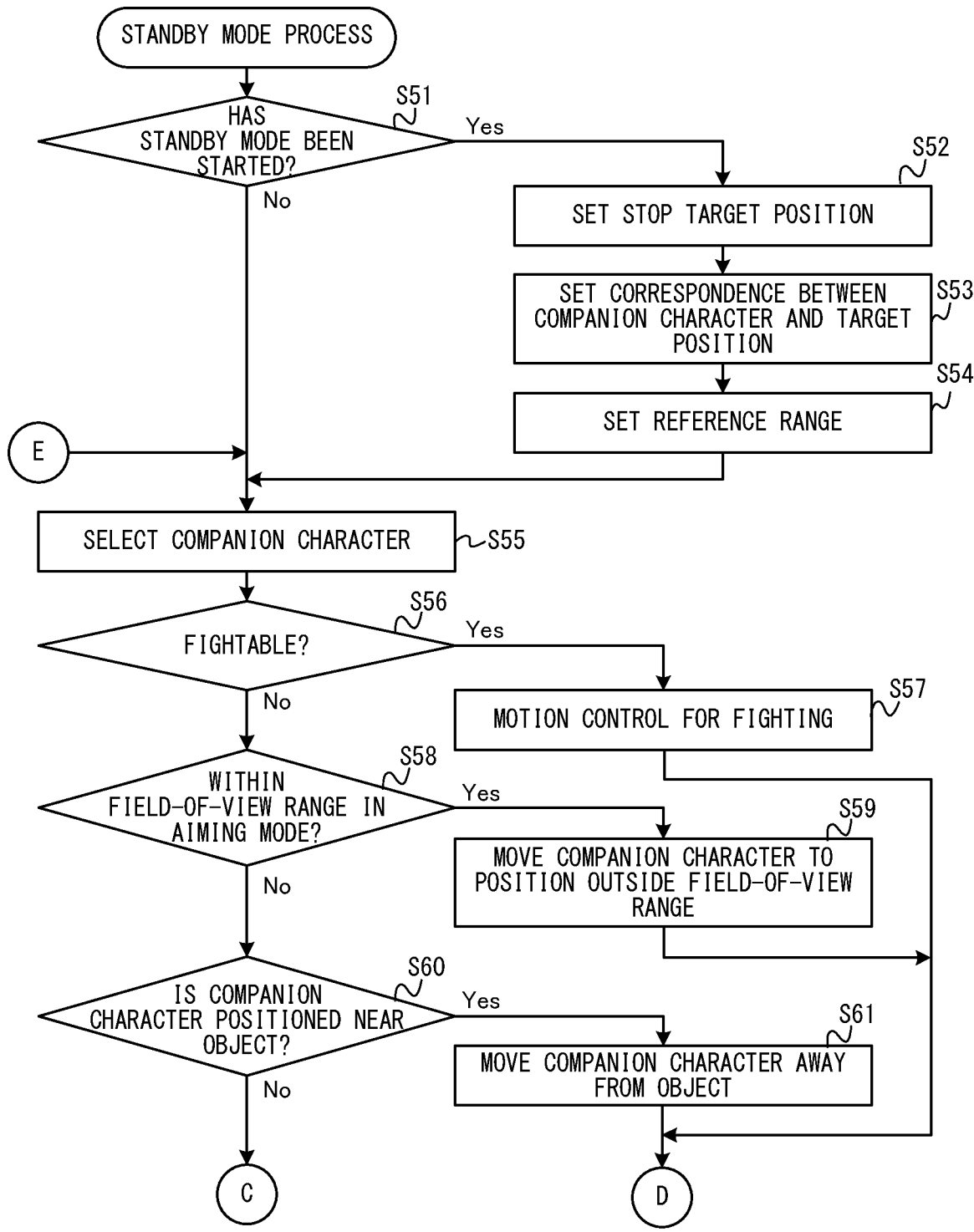
FIG. 25 is a sub flowchart showing an example of a specific flow of a standby mode process in step S14 shown in FIG. 22.
Figure 26:
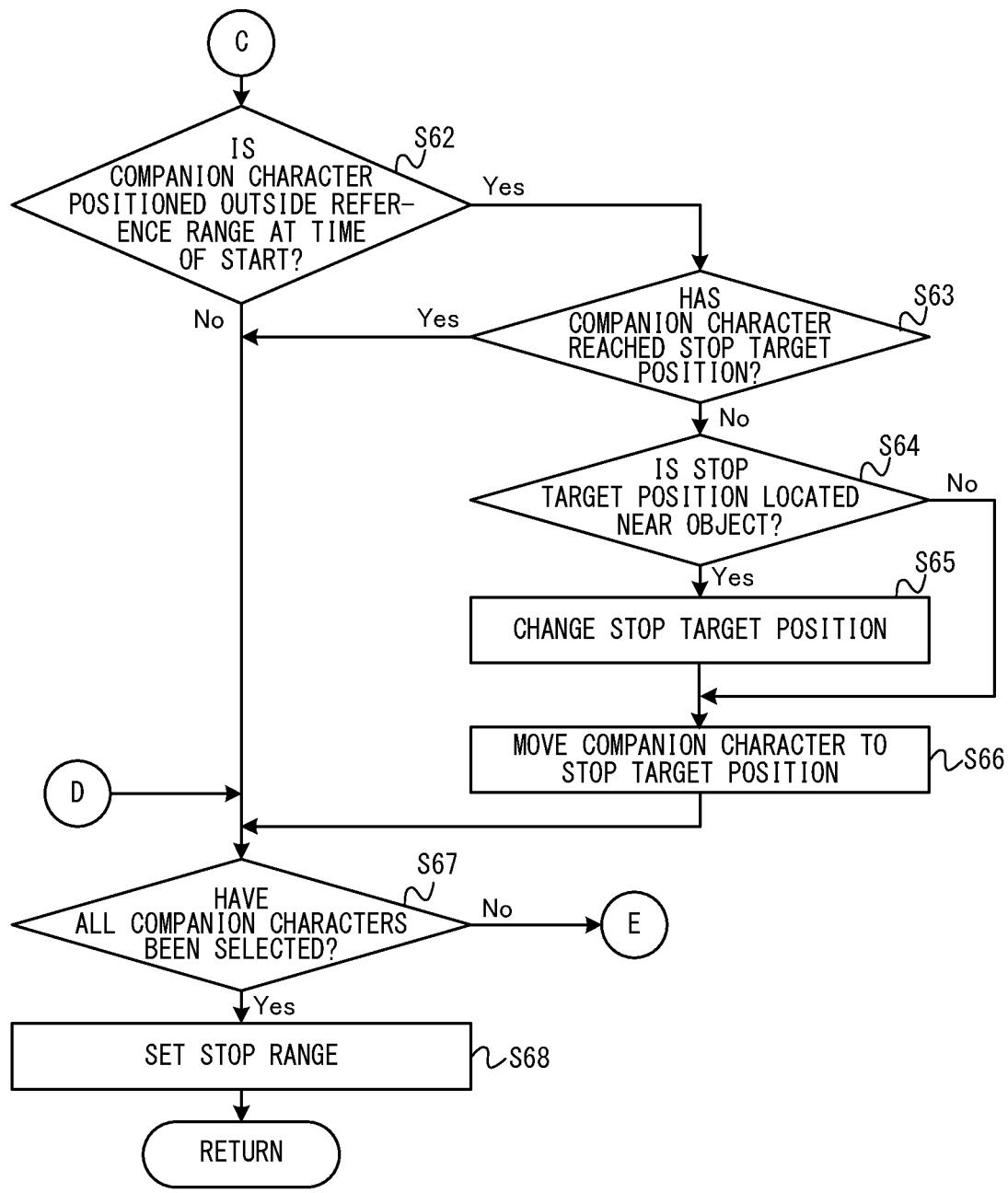
FIG. 26 is a sub flowchart showing a specific example of the standby mode process in step S14 shown in FIG. 22.

FIG. 25 and FIG. 26 are sub flowcharts showing an example of a specific flow of the standby mode process in step S14 shown in FIG. 22. In the standby mode process, first, in step S51, the processor 81 determines whether or not the standby mode has just been started. This determination is performed based on whether or not the process in step S10 (i.e., the process of shifting the control mode to the standby mode) has been executed in the current process loop of steps S1 to S23. When the determination result in step S51 is positive, the process in step S52 is executed. When the determination result in step S51 is negative, the processes in steps S52 to S54 are skipped and the process in step S55 is executed.

In step S52, the processor 81 sets the stop target positions described above. Specifically, the processor 81 sets stop target positions as many as the companion characters appearing in the game space, according to the method described in the above "[2-2. Process of controlling movement of companion character]". When a designated companion character is set, one of one or more stop target positions being set is the designated stop target position. Next to step S52, the process in step S53 is executed.

In step S53, the processor 81 sets a correspondence relationship between the stop target positions set in step S52 and the companion characters. This correspondence relationship is set according to the method described in the above "[2-2. Process of controlling movement of companion character]". When a designated companion character is set, the correspondence relationship is set such that the designated companion character corresponds to a designated stop target position. The processor 81 updates the target position data included in the companion character data stored in the memory such that the target position data indicates the set correspondence relationship. Next to step S53, the process in step S54 is executed.

In step S54, the processor 81 sets a reference range in the game space, based on the result of controlling the motion of the player character in the process in step S1. For example, the processor 81 stores in advance information for specifying the reference range (e.g., the center position of the reference range, i.e., the current position of the player character) in the memory. Next to step S54, the process in step S55 is executed.

In step S55, the processor 81 selects one character from among the companion characters appearing in the game space. At this time, the processor 81 selects a companion character that has not yet been selected in a process loop of steps S55 to S65 in the current standby mode. Next to step S55, the process in step S56 is executed.

In step S56, the processor 81 determines whether or not the companion character selected in step S55 is in the fightable state. This determination is performed similarly to the determination in step S34. When the determination result in step S56 is positive, the process in step S57 is executed. When the determination result in step S56 is negative, the process in step S58 is executed.

In step S57, the processor 81 controls the companion character selected in step S55 to perform a motion for fighting. The process in step S57 is performed similarly to the process in step S35. Next to step S57, the process in step S67 shown in FIG. 26 is executed.

In step S58, when the game image is generated in the aiming mode described above, the processor 81 determines whether or not the companion character selected in step S55 is positioned within the field-of-view range of the virtual camera. When the determination result in step S58 is positive, the process in step S59 is executed. When the determination result in step S58 is negative, the process in step S60 is executed.

In step S59, the processor 81 moves the companion character selected in step S55 to a position outside the field-of-view range of the virtual camera. At this time, the processor 81 updates the companion character data stored in the memory such that the data indicates the position and the orientation after the movement. The companion character may not necessarily be controlled to move out of the field-of-view range of the virtual camera by a single process in step S59. Since the upper limit is set to the moving speed, the companion character may be controlled to move out of the field-of-view range of the virtual camera while the process in step S59 is performed multiple times. Next to step S59, the process in step S67 shown in FIG. 26 is executed.

In step S60, the processor 81 determines whether or not the companion character selected in step S55 is placed near the action target object described above. The determination result in step S60 is positive (1) when the action target object is placed near the companion character positioned within the reference range at the time of entry to the standby mode, or (2) when the action target object appears near the companion character stopping at the stop target position, after the shifting to the standby mode. Determination as to whether or not the companion character is placed near the action target object is performed according to whether or not the distance between the action target object and the companion character is shorter than the width of the longest part of the action range. When the determination result in step S60 is positive, the process in step S61 is executed. When the determination result in step S60 is negative, the process in step S62 shown in FIG. 26 is executed.

In step S61, the processor 81 moves the companion character selected in step S55 to a position distant from the action target object. Specifically, the processor 81 moves the companion character to a position at which the distance between the action target object and the companion character is longer than the width of the longest part of the action range. At this time, the processor 81 updates the companion character data stored in the memory such that the data indicates the position and the orientation after the movement. The companion character may not necessarily be controlled to move to the position by a single process in step S61. Since the upper limit is set to the moving speed, the companion character may be controlled to move to the position by a plurality of processes in step S61. Next to step S61, the process in step S67 shown in FIG. 26 is executed.

In step S62 shown in FIG. 26, the processor 81 determines whether or not the companion character selected in step S55 is positioned outside the reference range at the time when the standby mode has been started. The determination process in step S62 is a process for determining whether the companion character selected in step S55 should be moved to the stop target position and stopped there, or the companion character should be stopped at the position at which the standby mode has been started. When the determination result in step S62 is positive, the process in step S63 is executed. When the determination result in step S62 is negative, the process in step S65 described later is executed.

In step S63, the processor 81 determines whether or not the companion character selected in step S44 has reached the stop target position. When the determination result in step S63 is negative, the process in step S64 is executed. When the determination result in step S63 is positive, the process in step S67 described later is executed.

In step S64, the processor 81 determines whether or not the stop target position corresponding to the companion character selected in step S55 is located near the action target object described above. The determination process in step S64 is a process for determining whether or not the stop target position corresponding to the companion character positioned outside the reference range at the time of entry to the standby mode, is located near the action target object. The determination as to whether or not the stop target position is located near the action target object is performed according to whether or not the distance between the action target object and the stop target position is shorter than the width of the longest part of the action range, for example. When the determination result in step S64 is positive, the process in step S65 is executed. When the determination result in step S64 is negative, the process in step S66 is executed.

In step S65, the processor 81 changes the stop target position corresponding to the companion character selected in step S55. Specifically, the processor 81 changes the stop target position to a position at which the distance between the action target object and the stop target position is longer than the width of the longest part of the action range. At this time, the processor 81 updates the target position data included in the companion character data stored in the memory such that the target position data indicates the changed position. Next to step S65, the process in step S66 is executed.

In step S66, the processor 81 moves the companion character selected in step S55 toward the stop target position corresponding to the companion character. The moving speed of the companion character in step S66 may be set by a method similar to the method in step S37. The processor 81 updates the companion character data stored in the memory such that the data indicates the position and the orientation after the movement. Next to step S66, the process in step S67 is executed.

The companion character is moved when the process in step S57, S59, S61, or S66 is executed, and when these processes are not executed, the process of moving the companion character is not executed and therefore the companion character remains stopped.

In step S67, the processor 81 determines whether or not all the companion characters appearing in the game space have been selected in step S55 (i.e., all the companion characters have been subjected to movement control). When the determination result in step S67 is negative, the process in step S55 is again executed. Thereafter, the process loop of steps S55 to S67 is repeated executed until all the companion characters are selected in step S55. When the determination result in step S67 is positive, the process in step S68 is executed.

In step S68, the processor 81 sets a stop range to be used for the determination in step S11. The stop range is set based on the reference range set in step S54, and the additional ranges set based on the current positions of the respective companion characters (see FIG. 16). After step S68, the processor 81 ends the standby mode process.

4. Functions and Effects of Exemplary Embodiment, and Modifications

As described above, in the exemplary embodiment, the information processing system (specifically, the game system 1) is configured to include the following means (in other words, a game program as an example of an information processing program is configured to cause a computer to function as the following means).

Player character control means that moves a player character in a virtual space according to a first operation input performed by a user (step S1).

Non-player character control means that performs, in the virtual space, a movement control including at least: a control for moving a non-player character (e.g., any of the companion characters 202 to 206) so as to accompany the player character, according to movement of the player character (step S13); and a control for stopping movement of the non-player character within a first range (e.g., the reference range) including the player character, according to stop of movement of the player character (step S14).

First control execution means that executes a first control corresponding to the non-player character (e.g., a control for causing the companion character to perform a motion in a readiness state, or a control for causing the companion character to perform a skill motion), according to a second operation input performed by the user in a state where a predetermined positional relationship indicating that the player character and the non-player character are near to each other is satisfied (e.g., a state where the non-player character is positioned within an action range of the player character) (step S16 or S20).

in a case where the player character resumes moving after having been stopped, (1) if the player character is positioned within a second range (e.g., the stop range) including the first range, the non-player character control means does not resume the control for moving the non-player character so as to accompany the player character even when the player character moves, and (2) the non-player character resumes the control for moving the non-player character so as to accompany the player character, according to the player character having moved out of the second range.

According to the above configuration, since movement of the non-player character is controlled according to movement and stop of the player character, the non-player character can be placed around the player character, and the non-player character can be stopped around the player character. This allows the user to easily bring the player character near to the non-player character according to the user's intention.

The first control is not limited to a control for making the corresponding non-player character to perform a motion, and may be any control to be executed regarding the non-player character. For example, the game system 1 may execute, as the first control, a control for causing the player character to perform any motion to the non-player character (e.g., a motion of the player character talking to the non-player character), or a control for displaying information regarding the non-player character (e.g., status information such as attributes).

The "predetermined positional relationship indicating that the player character and the non-player character are near to each other" indicates the relationship subject to the distance between the player character and the non-player character, but is not limited to the relationship subject to the distance only. For example, the positional relationship may be a relationship subject to the orientation of the player character in addition to the distance between the player character and the non-player character, as in the case where the non-player character is positioned within the action range of the player character. Thus, the "predetermined positional relationship indicating that the player character and the non-player character are near to each other" is not always satisfied even if the distance between the player character and the non-player character is equal to or less than a predetermined value. Also, there may be a case that does not correspond to the above positional relationship even if the distance between the player character and the non-player character is equal to or less than the predetermined value.

The above phrase "stopping movement of the non-player character according to stop of movement of the player character" means that stop of movement of the non-player character is triggered by stop of movement of the player character, and that the timing to stop movement of the non-player character is not limited. That is, as in the exemplary embodiment, a companion character as an example of the non-player character may be stopped at a time point when the player character is stopped, or may be stopped at a time point after the stop of the player character. Moreover, the above phrase "stopping movement of the non-player character according to stop of movement of the player character" means not to exclude a case where, after the non-player character has been controlled to stop moving, even if the player character is not outside the second range, the non-player character moves according to any condition (e.g., any of the first to third exceptions in the exemplary embodiment having occurred).

The above phrase "stopping movement of the non-player character within a first range including the player character" means that the position at which the non-player character stops moving is within the first range, and that the method and timing for setting the first range are not limited. For example, the first range may be set based on the position of the player character, like the reference range in the exemplary embodiment. Alternatively, the first range may be set based on the position of the non-player character in addition to the position of the player character, unlike the exemplary embodiment.

Therefore, the "control for stopping movement of the non-player character within a first range including the player character, according to stop of movement of the player character" includes controls as follows.

Control including: stopping the non-player character at a time point when the player character has stopped moving; and setting the first range including the player character and the non-player character.

Control including: constantly setting a range based on the position of the player character (note that movement control for the non-player character is performed without considering this range while the non-player character moves accompanying the player character); setting, as the first range, the range at the time point when the player character has stopped moving; and moving the non-player character so as to be positioned within the first range at a time point after the above time point and then stopping the non-player character.

The first range and the second range may be the same range, or different ranges.

It can also be said that the information processing system (specifically, the game system 1) according to the above exemplary embodiment is configured to include the following means (in other words, a game program as an example of an information processing program is configured to cause a computer to function as the following means).

Player character control means that moves a player character in a virtual space according to a first operation input performed by a user.

Non-player character control means that performs a control for moving a non-player character so as to accompany the player character according to movement of the player character in the virtual space.

First control execution means that executes a readiness control for shifting the non-player character to a readiness state of a predetermined control corresponding to the non-player character, according to a second operation input performed by the user in a state where a predetermined positional relationship indicating that the player character and the non-player character are near to each other is satisfied.

Second control execution means that executes a predetermined control toward a direction or a position designated by the user, according to a third operation input, including designation of the direction or the position, having been performed, in a case where the non-player character enters the readiness state of the predetermined control.

According to the above configuration, the user performs the third operation input for the predetermined control after performing the second operation input for the readiness control. Therefore, for example, the possibility of an erroneous operation, such as the predetermined control being performed toward an unintended direction or position or an unintended control being performed, can be reduced. In the above configuration, the control for stopping the non-player character as described above may or may not be performed. In either case, the above configuration has the effect of reducing the possibility of the erroneous operations.

It can also be said that the information processing system (specifically, the game system 1) according to the above exemplary embodiment is configured to include the following means (in other words, a game program as an example of an information processing program is configured to cause a computer to function as the following means).

Player character control means that moves a player character in a virtual space according to a first operation input performed by a user.

Non-player character control means that performs a control for moving a non-player character so as to accompany the player character according to movement of the player character in the virtual space.

First control execution means that executes a first control corresponding to the non-player character, according to a second operation input performed by the user in a state where a predetermined positional relationship indicating that the player character and the non-player character are near to each other is satisfied.

The non-player character control means makes the moving speed of the non-player character lower than the moving speed of the player character, according to the player character moving toward the non-player character while the non-player character is moving accompanying the player character (step S38).

According to the above configuration, the player character is more likely to approach the non-player character, and therefore, the first control corresponding to the non-player character can be easily executed. In the above configuration, the control for stopping the non-player character as described above may or may not be performed. In either case, the above configuration has the effect of reducing the possibility of the erroneous operations.

It can also be said that the information processing system (specifically, the game system 1) according to the above exemplary embodiment is configured to include the following means (in other words, a game program as an example of an information processing program is configured to cause a computer to function as the following means).

Player character control means that moves a player character in a virtual space according to a first operation input performed by a user (step S1).

Non-player character control means that moves a plurality of non-player characters (e.g., the companion characters 202 to 206) being allies of the player character in the virtual space, according to movement of the player character (steps S13, S14).

Control execution means that executes a first control corresponding to one non-player character among a plurality of non-player character, according to a second operation performed by the user in a state where a predetermined positional relationship indicating that the player character and the one non-player character are near to each other is satisfied (e.g., a state where the non-player character is positioned within an action range of the player character) (step S16 or S20).

Designated character setting means that sets the non-player character subjected to the first control, as a designated non-player character (step S18).

The non-player character control means performs movement control for the plurality of non-player characters so that the distance between the player character and the designated non-player character among the plurality of non-player characters becomes shorter than the distance between the player character and any normal non-player character different from the designated non-player character (FIG. 19 and FIG. 20).

According to the above configuration, the designated non-player character is more easily subjected to the first control than the normal non-player character, and therefore, the user, having performed the first control on a desired non-player character, can easily perform the first control again on the non-player character. This allows the player character to easily perform a motion (i.e., a motion according to the first control) to the desired non-player character. In the above configuration, the control for stopping the non-player character as described above may or may not be performed. In either case, the above configuration has the effect of reducing the possibility of the erroneous operations.

The phrase "performing movement control for the plurality of non-player characters so that the distance between the player character and the designated non-player character among the plurality of non-player characters becomes shorter than the distance between the player character and any normal non-player character different from the designated non-player character" is not limited to a case where the respective non-player characters are arranged so as to constantly maintain the above state, but means that the movement control may be performed based on an algorithm for making the above state. The movement control described above may be, for example, a control process of controlling the non-player character to approach the player character when the distance from the player character has exceeded an upper limit, and setting the upper limit regarding the designated companion character to be lower than the upper limit regarding the normal companion character. Moreover, for example, the movement control may be a control process of setting a movable range of the non-player character, and limiting the movable range regarding the designated companion character to a range nearer to the player character than the movable range of the normal character.

In the exemplary embodiment, the various ranges (specifically, the reference range, the additional ranges, and the stop range) and the target positions (specifically, the movement target positions and the stop target positions) are not displayed. This makes the game image to be easily viewable by the user. In other embodiments, some or all of the various ranges and the target positions may be displayed.

In the exemplary embodiment, the player character and a companion character as an example of a non-player character are not replaced with each other. However, in other embodiments, the player character and a non-player character may be replaced with each other.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the another information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system may include a configuration for achieving the effect and execute a process for achieving the effect, and may not include other configurations and may not execute other processes.

The exemplary embodiment can be used as, for example, a game system and a game program for the purpose of, for example, causing a player character to easily perform a motion to a desired non-player character.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program for causing a processor of an information processing apparatus to execute game processing,
the game program causing the processor to execute:
performing a control for moving a player character in a virtual space according to a first operation input performed by a user;
performing a control for moving a plurality of non-player characters in the virtual space according to movement of the player character, the non-player characters being allies of the player character;
performing a first control corresponding to one non-player character among the plurality of non-player characters, according to a second operation input performed by the user in a state where a predetermined positional relationship indicating that the non-player character and the player character are near to each other is satisfied; and
setting the non-player character on which the first control is performed, as a designated non-player character,
the processor performing a movement control for the plurality of non-player characters so that a distance between the player character and the designated non-player character among the plurality of non-player characters becomes shorter than a distance between the player character and any normal non-player character different from the designated non-player character.

2. The storage medium according to claim 1, wherein
the processor performs a first control corresponding to the normal non-player character, according to the second operation input performed by the user in a state where the designated non-player character is set and the normal non-player character and the player character are in the predetermined positional relationship, and
when the first control corresponding to the normal non-player character has been performed, the processor changes the designated non-player character having been set so far, to a normal non-player character, and sets the normal non-player character on which the first control has been performed, to a new designated non-player character.

3. The storage medium according to claim 1, wherein
while the plurality of non-player characters are moving according to movement of the player character, the processor performs the movement control for the plurality of non-player characters, with a positional relationship that the distance between the designated non-player character and the player character is shorter than the distance between the normal non-player character and the player character, and
according to stop of movement of the player character, the processor stops movements of the plurality of non-player characters at a position where the distance between the designated non-player character and the player character becomes shorter than the distance between the normal non-player character and the player character.

4. The storage medium according to claim 1, wherein
while the plurality of non-player characters are moving according to movement of the player character, the processor, according to movement of the player character toward at least one non-player character among the plurality of non-player characters, makes a moving speed of the non-player character lower than a moving speed of the player character.

5. The storage medium according to claim 1, wherein
if a fighting condition for one of the plurality of non-player characters to fight against another character has been satisfied, the processor moves the non-player character, and
while the non-player character is moving because of the fighting condition having been satisfied, the processor performs the movement control for the plurality of non-player characters, with a positional relationship that the distance between the designated non-player character and the player character is shorter than the distance between the normal non-player character and the player character.

6. The storage medium according to claim 1, wherein
the processor stops movements of the plurality of non-player characters according to stop of movement of the player character,
in a case where the player character resumes moving after having been stopped, (1) while the player character is moving within a first range, the processor does not resume movement of the designated non-player character according to movement of the player character, and (2) the processor, according to the player character having moved out the first range, resumes movement of the designated non-player character according to movement of the player character,
in a case where the player character resumes moving after having been stopped, (1) while the player character is moving within a second range, the processor does not resume movement of the normal non-player character according to movement of the player character, and (2) the processor, according to the player character having moved out of the second range, resumes movement of the normal non-player character according to movement of the player character, and
the first range is narrower than the second range.

7. The storage medium according to claim 1, wherein
the game program causes the processor to further execute:
setting, for each of the plurality of non-player characters, a stop target position that is a target position for each of the plurality of non-player characters to stop moving according to stop of movement of the player character, and
the processor sets the stop target positions of the plurality of non-player characters so that a distance between the stop target position of the designated non-player character and the player character becomes shorter than a distance between the stop target position of the normal non-player character and the player character.

8. The storage medium according to claim 1, wherein in a specific game scene, the processor sets, as the designated non-player character, a non-player character that is associated with the specific game scene among the plurality of non-player characters.

9. The storage medium according to claim 1, wherein the first control is a control for shifting to a readiness state of a second control that may cause the non-player character to have an influence on another object, and the game program causes the processor to further execute performing the second control according to a third operation input performed by the user, in the readiness state of the second control.

10. An information processing system comprising one or more processors, the one or more processors executing:
  moving a player character in a virtual space according to a first operation input performed by a user;
  moving a plurality of non-player characters in the virtual space according to movement of the player character, the non-player characters being allies of the player character;
  performing a first control corresponding to one non-player character among the plurality of non-player characters, according to a second operation input performed by the user in a state where a predetermined positional relationship indicating that the non-player character and the player character are near to each other is satisfied; and
  setting the non-player character on which the first control is performed, as a designated non-player character, the one or more processors performing a movement control for the plurality of non-player characters so that a distance between the player character and the designated non-player character among the plurality of non-player characters becomes shorter than a distance between the player character and any normal non-player character different from the designated non-player character.

11. A game processing method executed by an information processing system, the information processing system executing:
  moving a player character in a virtual space according to a first operation input performed by a user;
  moving a plurality of non-player characters in the virtual space according to movement of the player character, the non-player characters being allies of the player character;
  performing a first control corresponding to one non-player character among the plurality of non-player characters, according to a second operation input performed by the user in a state where a predetermined positional relationship indicating that the non-player character and the player character are near to each other is satisfied; and
  setting the non-player character on which the first control is performed, as a designated non-player character, the information processing system performing a movement control for the plurality of non-player characters so that a distance between the player character and the designated non-player character among the plurality of non-player characters becomes shorter than a distance between the player character and any normal non-player character different from the designated non-player character.

* * * * *